United States Patent
Hooley et al.

[11] Patent Number: 5,966,267
[45] Date of Patent: *Oct. 12, 1999

[54] LONG ARM COMPRESSION CONNECTOR WITH BUMP HEADER

[75] Inventors: Robert W. Hooley, Harrisburg; Samuel Radanovic, Etters; Mark S. Robertson, York; Kenneth A. Neidert, Etters; Alan Raistrick, Harrisburg, all of Pa.

[73] Assignee: FCI Americas Technology, Inc., Reno, Nev.

[*] Notice: This patent issued on a continued prosecution application filed under 37 CFR 1.53(d), and is subject to the twenty year patent term provisions of 35 U.S.C. 154(a)(2).

[21] Appl. No.: 08/671,805

[22] Filed: Jun. 25, 1996

Related U.S. Application Data

[63] Continuation of application No. 08/276,118, Jul. 15, 1994, abandoned.

[51] Int. Cl.⁶ ............................. G11B 33/14; H01R 9/09; H01R 23/72
[52] U.S. Cl. ............................ 360/97.01; 439/66
[58] Field of Search ............................ 360/97.01, 97.02, 360/97.03, 97.04, 98.01, 98.07; 439/50, 52, 65, 66, 80, 81, 82, 83, 271, 273, 519, 556, 559, 325, 326, 84

[56] References Cited

U.S. PATENT DOCUMENTS

| | | | |
|---|---|---|---|
| 2,922,948 | 1/1960 | Washburn | 324/29.5 |
| 3,107,319 | 10/1963 | Vizzier | 439/65 |
| 3,432,801 | 3/1969 | Ruotolo | 439/51 |
| 3,654,592 | 4/1972 | Primorac | 339/176 MP |
| 3,915,537 | 10/1975 | Harris et al. | 339/64 R |
| 3,951,495 | 4/1976 | Donaher et al. | 339/17 CF |
| 4,199,209 | 4/1980 | Cherian et al. | 439/66 |
| 4,307,928 | 12/1981 | Petlock, Jr. | 339/254 |
| 4,315,663 | 2/1982 | Olsson | 339/17 M |
| 4,341,433 | 7/1982 | Cherian et al. | 339/176 MP |
| 4,533,203 | 8/1985 | Feldman et al. | 339/176 |
| 4,553,192 | 11/1985 | Babuka et al. | 439/66 |
| 4,620,761 | 11/1986 | Smith et al. | 339/75 MP |
| 4,647,126 | 3/1987 | Sobota, Jr. | 339/17 |
| 4,773,877 | 9/1988 | Kruger et al. | 439/482 |

(List continued on next page.)

FOREIGN PATENT DOCUMENTS

| | | |
|---|---|---|
| 0 009 314 | 4/1980 | European Pat. Off. . |
| 0 030 574 | 6/1981 | European Pat. Off. . |
| 3507464 A1 | 9/1985 | Germany . |
| 4344272 A1 | 6/1994 | Germany . |
| WO/08258 | 5/1992 | WIPO . |
| WO/94/11925 | 5/1994 | WIPO . |

OTHER PUBLICATIONS

European Supplementary Search Report dated Sep. 1, 1997, 3 pages, Application No. EP 95 926212.

*Primary Examiner*—David L. Ometz
*Attorney, Agent, or Firm*—Woodcock Washburn Kurtz Mackiewics LLP

[57] ABSTRACT

A compression arm connector for connecting two circuit substrates in a disk drive and a method of producing the same are provided. The compression arm connector replaces the need for two vertical connectors and a base plate header traditionally used in disk drives for connecting the two circuit substrates. Another compression arm connector for connecting wires to solder pads on a circuit substrate are also provided. The contacts of this compression arm connector are bent through an angle of more than about 90° to form a deflectable member and a solder member. The solder member may be exposed through the connector housing through the use of solder windows or passageways formed in the housing. Both connectors are capable of exhibiting large wipe and deflection capabilities. Additionally, both connectors can be used in a low-cost disk drive provided by the invention.

19 Claims, 21 Drawing Sheets

U.S. PATENT DOCUMENTS

| | | | |
|---|---|---|---|
| 4,778,404 | 10/1988 | Pass | 439/387 |
| 4,830,623 | 5/1989 | Owens et al. | 439/71 |
| 4,891,019 | 1/1990 | Olsson | 439/404 |
| 4,906,194 | 3/1990 | Grabbe | 439/71 |
| 4,915,636 | 4/1990 | Knight | 439/65 |
| 4,927,369 | 5/1990 | Grabbe et al. | 439/66 |
| 4,954,087 | 9/1990 | Lauks et al. | 439/71 |
| 4,978,308 | 12/1990 | Kaufman | 439/83 |
| 4,990,107 | 2/1991 | Fortuna | 439/637 |
| 4,998,886 | 3/1991 | Werner | 439/65 |
| 5,015,196 | 5/1991 | Yamada | 439/326 |
| 5,055,054 | 10/1991 | Doutrich | 439/66 |
| 5,145,384 | 9/1992 | Asakawa et al. | 439/78 |
| 5,158,468 | 10/1992 | Curtis et al. | 439/76 |
| 5,161,982 | 11/1992 | Mowry | 439/68 |
| 5,259,769 | 11/1993 | Cruise et al. | 439/65 |
| 5,263,880 | 11/1993 | Schwarz et al. | 439/733 |
| 5,308,252 | 5/1994 | Mroczkowski et al. | 439/66 |
| 5,324,205 | 6/1994 | Ahmad et al. | 439/66 |
| 5,337,202 | 8/1994 | Jabbarai et al. | 360/97.01 |
| 5,357,386 | 10/1994 | Haidari et al. | 360/97.02 |
| 5,358,411 | 10/1994 | Mroczkowski et al. | 439/66 |
| 5,378,160 | 1/1995 | Yumibe et al. | 439/65 |
| 5,464,355 | 11/1995 | Rothenberger | 439/559 |

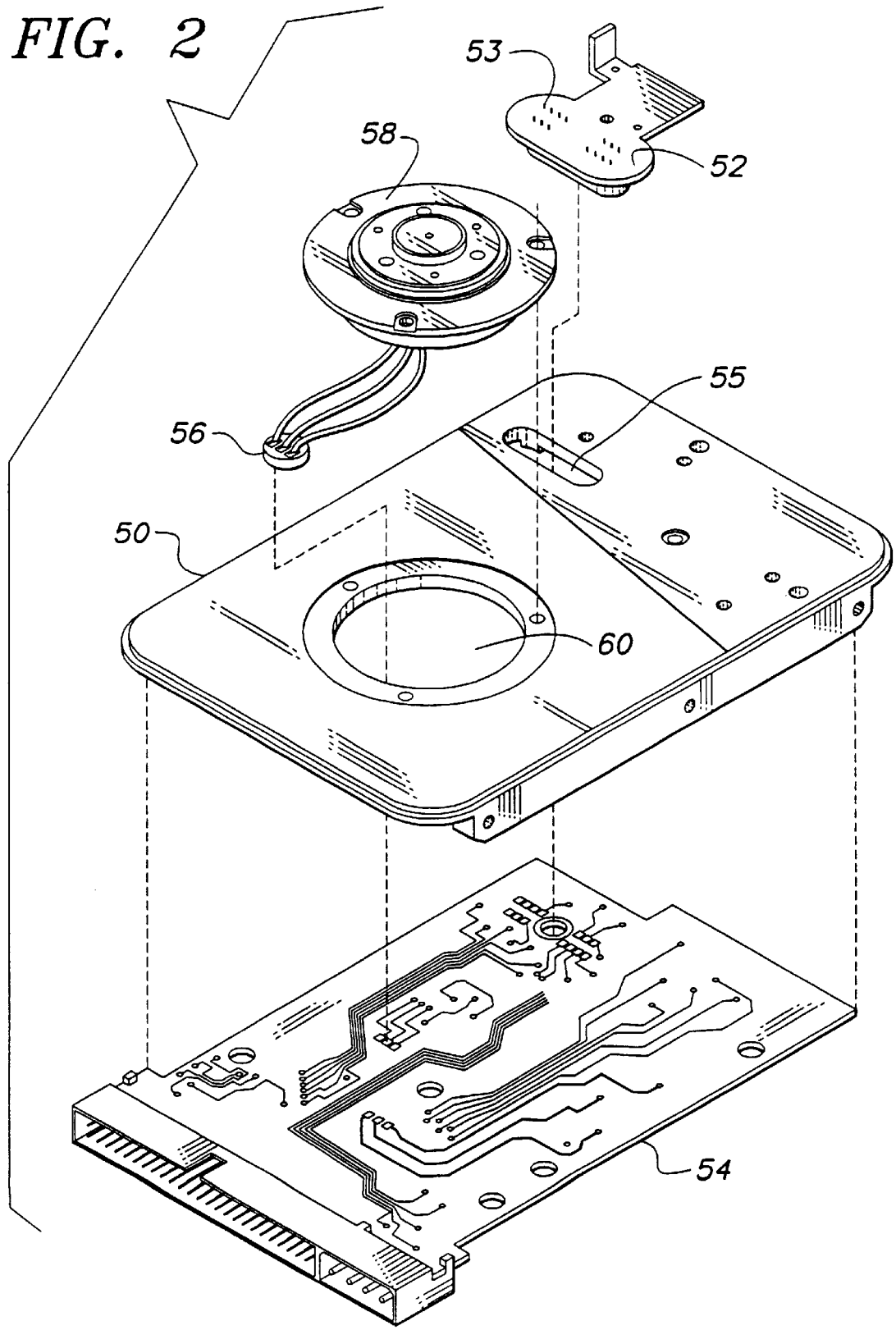

LONG ARM COMPRESSION CONNECTOR WITH BUMP HEADER

This is a continuation of application Ser. No. 08/276,118 filed Jul. 15, 1994 now abandoned.

FIELD OF THE INVENTION

The present invention relates to compression arm connectors and, more particularly, to compression arm connectors for use in disk drives.

BACKGROUND OF THE INVENTION

While the compression arm connectors of the present invention will be particularly described in connection with their use in the assembly of and use in disk drives, it should be understood that the compression arm connectors described and depicted herein are not to be limited thereto, since they may likewise be used in other devices.

The demand for increasing storage capacity in personal computers (PCs) has created new challenges for disk drive manufacturers. Disk drives installed in new computers must provide more storage than ever before, while at the same time maintaining costs at a minimum. Moreover, owners of existing PCs are seeking to supplement the storage capacity of their computers by adding on additional disk drives. Therefore, it is desirable to minimize the production costs of producing high-storage disk drives.

An exploded view of part of a conventional disk drive is shown in FIG. 1. A spin motor assembly 4 housing a spin motor (not shown) is mounted to the base plate 2 of the disk drive. In use a disk (not shown) is mounted to the assembly 4 so that the spin motor operates to cause the disk to rotate. While the disk is rotating, a mechanical arm (not shown) with a read/write head is positioned over the rotating disk to read data to the disk or write data from the disk. A flexible circuit 6 is used to provide the control signals to position the mechanical arm. An integrated circuit (IC) 8 serves as a serial-to-parallel port for the drive heads. A base plate header 10 provides a plurality of pins 12a which extend upward from the base plate 2 in a plane substantially perpendicular to the base plate. The flexible circuit has a mounting surface 14 with a plurality of clearance holes 16 that permit the pins 12a from the base plate header to pass through.

A circuit substrate such as printed circuit board (PCB) 18 provides the interface for data to be read to and written from the disk. Pins 12b of the base plate header 10 are coupled to PCB 18 via vertical card connector 20. Likewise, a vertical card connector (not shown) may then be connected to pins 12a to interface a second circuit substrate to PCB 18.

The spin motor is typically driven through an interface with the circuit substrate, e.g. PCB 18. Three printed conductors 22 are shown leading from three respective pins 12a to lead wires 24 associated with the spin motor (different spin motors may provide different numbers of lead wires). Each of the lead wires 24 is soldered to one of the printed conductors. The base plate 2 is typically designed with an opening or slot 26 to expose the lead wires 24.

Adding slot 26 and the printed conductors 22 require additional assembly steps and, therefore, increase the overall cost of the disk drive. Therefore, in some disk drives the lead wires 24 are exposed through the underside of the base plate 2 where the spin motor frame is secured to the base plate. The lead wires may then be soldered directly to solder pads provided on PCB 18 to drive the spin motor. Since the lead wires are soldered directly to the PCB, the PCB and the spin motor cannot be disconnected for repair or replacement without probable damage to the PCB or the spin motor.

A conventional disk drive unit is assembled by mounting the spin motor assembly in its frame to the base plate. The base plate shown in FIG. 1 has a sunken portion in which the spin motor may be placed. Alternatively, the base plate may have an aperture through which the spin motor is secured. The lead wires of the spin motor are then coupled to corresponding solder pads or printed conductors which provide the power to drive the spin motor. A base plate header is fixed to the base plate by any suitable means such as by gluing or bolting the header correctly to the base plate. A flexible circuit is attached to the base plate header by inserting the header pins into clearance holes formed within a mounting surface of the flexible circuit. A circuit substrate may then be connected to each side of the base plate header via vertical card connectors.

It should be evident that the assembly of conventional disk drives requires numerous steps in connecting many of its components. Moreover, many of these steps are manual thereby increasing the cost of production. Therefore, there is a need to eliminate some of the steps, particularly those that require manual interaction. However, in eliminating such steps care must be taken to permit repair or replacement of individual components without destroying other disk drive components.

SUMMARY OF THE INVENTION

In response to these needs, one object of the present invention is to combine a number of connectors used in the disk drive into a single connector. Another object of the present invention is to provide a spin motor connector to connect the lead wires of the spin motor to solder pads on a circuit substrate to drive the spin motor thereby eliminating the need for soldering the lead wires to the circuit substrate and eliminating the need to add flexible conductors onto the base plate.

According to the invention, a first compression arm connector comprising an insulative housing, a conductive multi-curved beam member capable of being received in the housing and forming a contact element of the connector, and a conductive member integrally connected to the contact element and extending from the housing is provided. The contact element preferably has a protrusion that forms a mating surface for mating with a first circuit substrate. The conductive member is preferably used to electrically interface the compression arm connector to a second circuit substrate. In one advantageous embodiment of the invention, the contact element is capable of deflecting between about 0.008 inches and about 0.02 inches in response to a mating force of between about 100 g. and 300 g. In this embodiment the mating surface of the contact element is capable of being deflected against a conductive surface of the first circuit substrate so that the protrusion is movable over the conductive surface to provide a wipe of about 0.02 inches. In a more preferred embodiment, the conductive member provides a taper so that it creates a gas-tight seal with the housing.

The conductive member may be implemented as a pin or movable contact element. The compression arm connector preferably comprises a plurality of conductive multi-curved beam members associated with respective conductive members extending from the housing.

In a preferred embodiment, the housing comprises a base portion and a contact support section. At least a part of the base portion and a part of the contact support section preferably have a reduced thickness to minimize stress in the housing. Moreover, the contact support section preferably comprises a plurality of slots in which the contact elements are inserted. The slots may provide openings on a top side and at least a lateral side of the contact support section so that the deflection of the contact elements is not restrained by the housing.

A method of producing a compression arm connector, according to the invention comprises the steps of stamping a plurality of multi-curved contacts from a conductive plate so that the contacts are connected together by a detachable carrier strip, molding a housing with slots from an insulative material, and inserting the plurality of multi-curved contacts into the slots of the housing so that the contacts are biased out from the top surface and capable of being deflected out from the side surface. The detachable carrier strip is detached from the plurality of contacts to form the compression arm connector. The housing is preferably molded with a thin base to reduce stress thereby substantially preventing the housing from bowing.

A second compression arm connector for connecting lead wires to a circuit substrate is also provided by the invention. This connector comprises a plurality of movable contacts bent through an angle greater than about 90° so that the contact is divided into a deflectable member and an associated solder member; and a housing for supporting the plurality of contacts such that at least a portion of each of the deflectable and solder members are exposed through the housing. The deflectable members form contact elements and each lead wire can be soldered to one of the solder members.

In one preferred embodiment, the housing has a plurality of solder windows through which the solder members are exposed and in which the lead wires can be soldered to the solder members. The housing preferably has a circular shape.

More preferably, each of the deflectable members may be provided with a protrusion for electrically contacting a conductive surface of a circuit substrate. In this embodiment, each of the plurality of contacts is capable of deflecting between about 0.014 inches and about 0.036 inches in response to a mating force of at least about 70 g. Moreover, the protrusion is movable on the conductive surface to provide at least about 0.015 inches of wipe.

In a more preferred embodiment, the housing comprises an opening from a top side of the connector to an underside of the connector through which the lead wires can be advanced from the top side through to the underside. A multi-wire passageway adjoining the opening is connected to a plurality of single-wire passageways which preferably expose a portion of a respective solder member. In this preferred embodiment, the deflectable members and the solder members are accessible from the same side of the housing.

A method of producing a compression arm connector for use in connecting lead wires to a circuit substrate comprising the steps of stamping a plurality of contacts from a conductive plate so that the plurality of contacts are connected together by a detachable carrier strip; molding the plurality of contacts into an insulative housing; and bending each of the plurality of contacts more than about 90° is also provided by the invention.

The plurality of contacts are preferably arranged into groups of three contacts and each group preferably molded into a corresponding insulative housing. The housings are formed with solder windows exposing a portion of corresponding contacts molded into the housing. Accordingly each housing has three associated solder windows formed therein.

More preferably, a molded segment is formed in the housing such that each contact is molded into the housing directly above the molded segment. Each of the plurality of contacts may then be bent through an angle greater than of at least 90° by forcibly pressing each of the contacts against the molded segment.

The present invention also provides a disk drive comprising a compression arm connector for interfacing first and a second circuit substrates and another compression arm connector for connecting the lead wires from the spin motor to solder pads on the first circuit substrate. A method for assembling the disk drive according to the invention is also provided.

BRIEF DESCRIPTION OF THE DRAWINGS

The present invention will be better understood, and its numerous objects and advantages will become apparent by reference to the following detailed description of the invention, when taken in conjunction with the following drawings, in which:

FIG. 2 shows an exploded view of a portion of a disk drive according to the present invention;

DETAILED DESCRIPTION OF THE INVENTION

Figure 1:
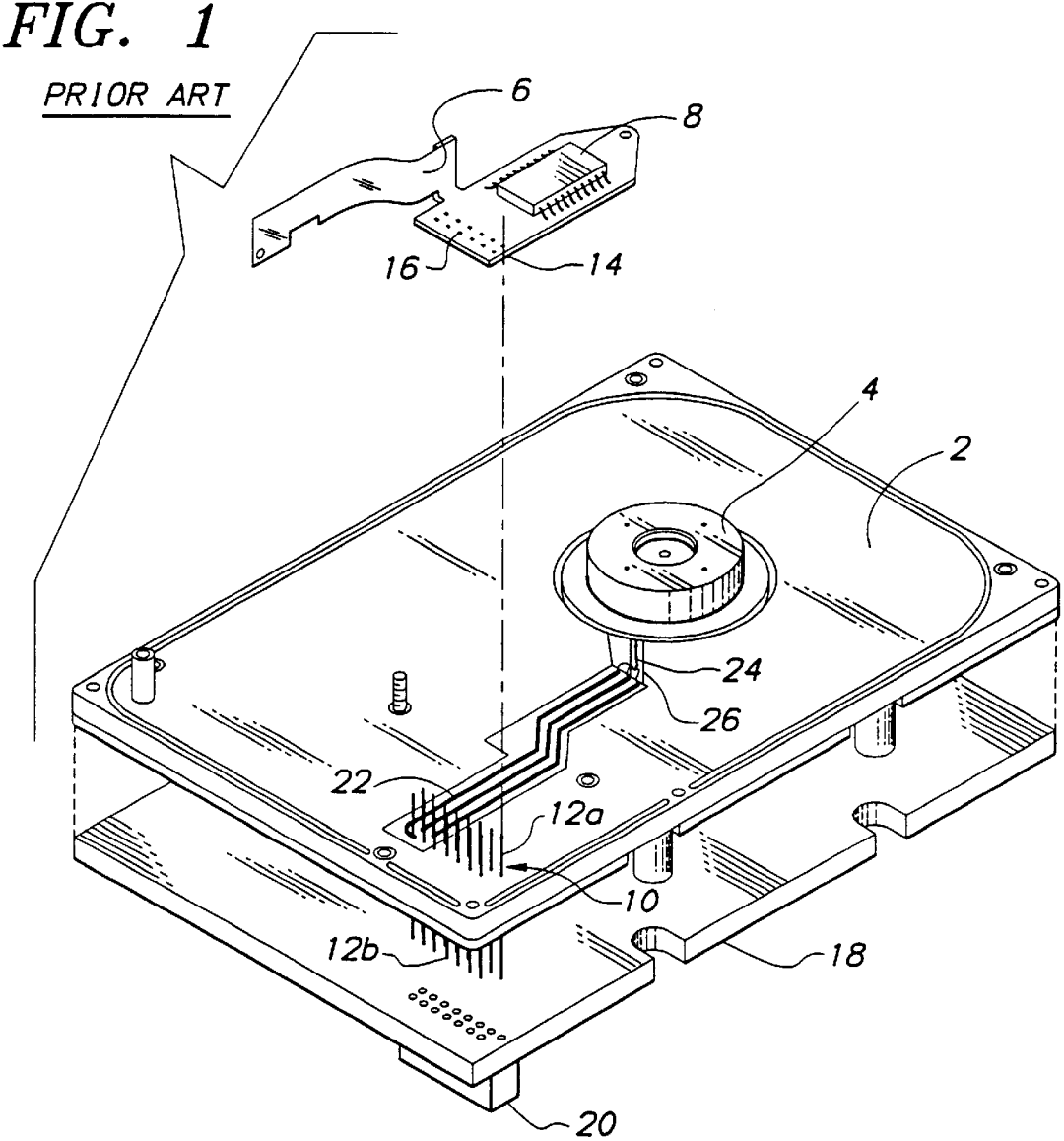
FIG. 1 shows an exploded view of part of a conventional disk drive.

The present invention provides two compression arm connectors for particular use in disk drives, although their use is not to be limited thereto. FIG. 2 shows an exploded view of a portion of a disk drive according to the invention. A compression arm connector 52 is used in place of the base plate header described in connection with FIG. 1 to connect a data interface circuit substrate 54 located below the base plate 50. An opening 55 is preferably provided in base plate 50 so that compression arm connector 52 can be partially inserted to mate with conductors on the substrate 54. The compression arm connector 52 preferably provides conductive members 53 extending from a top surface of the connector so that a flexible circuit (not shown) may be connected to the connector in a similar manner as described above. The compression arm connector 52 thus replaces the base plate header and the two vertical connectors described in connection with FIG. 1. A spin motor connector 56 is shown between the spin motor assembly 58 and the circuit substrate 54. An aperture 60 is formed in the base plate. The spin motor assembly can be disposed within aperture 60 to permit direct access to the circuit substrate below.

Figure 3:
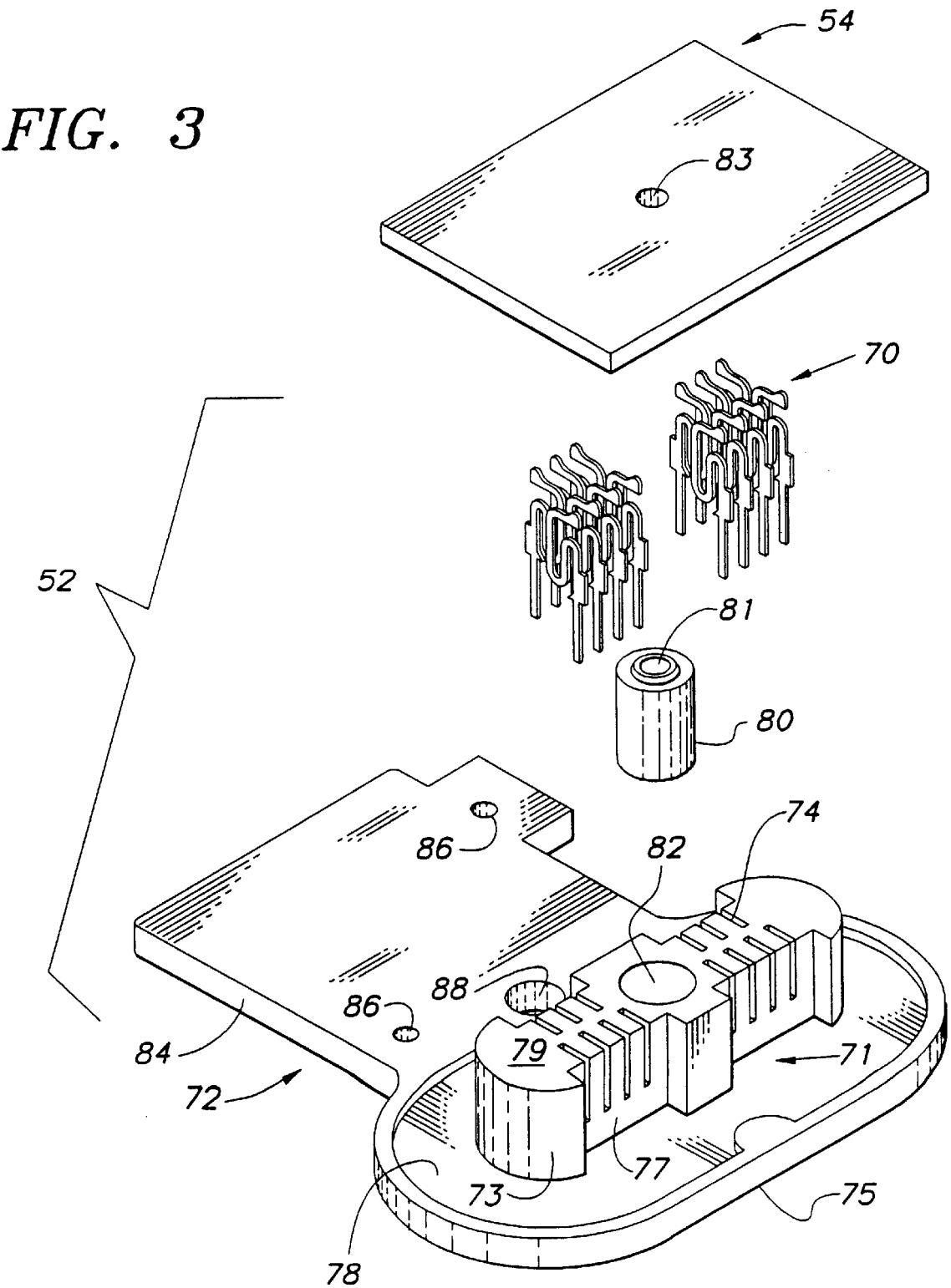
FIG. 3 shows an exploded view of the compression arm connector shown in FIG. 2.

An exploded view of the compression arm connector 52 is shown in FIG. 3. A plurality of multi-curved contacts 70 are supported in a housing 72 within respective slots 74 formed within the housing. The housing comprises a contact support member 73 referred to as a stack tower in which the slots 74 are formed, a first base plate portion 75, and a second base plate portion 84. In preferred embodiments, the slots 74 provide openings in a first surface 77 and a second surface 79 of the contact support member of the housing so that the movement of the contacts are not restrained by the housing itself. The first and second base plate portions 75, 84 are referred to in combination as the sealing base of the connector. The housing is preferably molded from an insulative material such as liquid crystal polymer.

In preferred embodiments, a trough 78 is molded into the first base plate portion 75 to advantageously thin the base plate to prevent undesirable stress causing the housing to bow. Since it is typically desirable to seal off the inside of the disk drive from unwanted particles and other contaminants that may be harmful to the disk, a foam-like seal (not shown) may be placed into the trough 78. The contact support member may also be thinned in the slotted regions 71 to likewise minimize stress within the housing. It should be understood that the dimensions of the housing walls should be selected to maximize thickness for stability and strength and to minimize the thickness to reduce stress. Therefore, the stack tower is preferably thinned at the slotted sections 71 as shown in FIG. 3. In a preferred embodiment, the thickness of the first base portion 75 is about eight to sixty thousandths of an inch and more preferably about twenty to thirty-five thousandths of an inch.

The second base plate portion 84 is primarily used for tooling purposes in the assembly of the disk drive. For instance, the second base plate portion may have tooling holes 86 formed therein so that a mechanical assembler can grasp the compression arm connector to secure it to the base plate. It should be understood that the compression arm connector 52 may be secured to the base plate 50 in numerous ways. For example, the base plate 50 preferably provides an opening 55 (FIG. 2) having dimensions to permit the contact support member 73 of the connector housing 72 to pass through. Respective holes 88 may additionally be formed in the second base plate portion of the housing 84 and the base plate of the disk drive (not shown) so that they are aligned when the contact support member is inserted through the appropriate base plate aperture. A threaded screw may then be used to secure the housing to the base plate of the disk drive. In the alternative, an opening 82 may additionally be formed in the contact support member and fitted with a threaded receptacle 80 with a threaded insert 81. A corresponding opening 83 would be provided on the circuit substrate 54 so that a threaded screw (not shown) could be used to screw the connector and the circuit substrate together.

Figure 4:
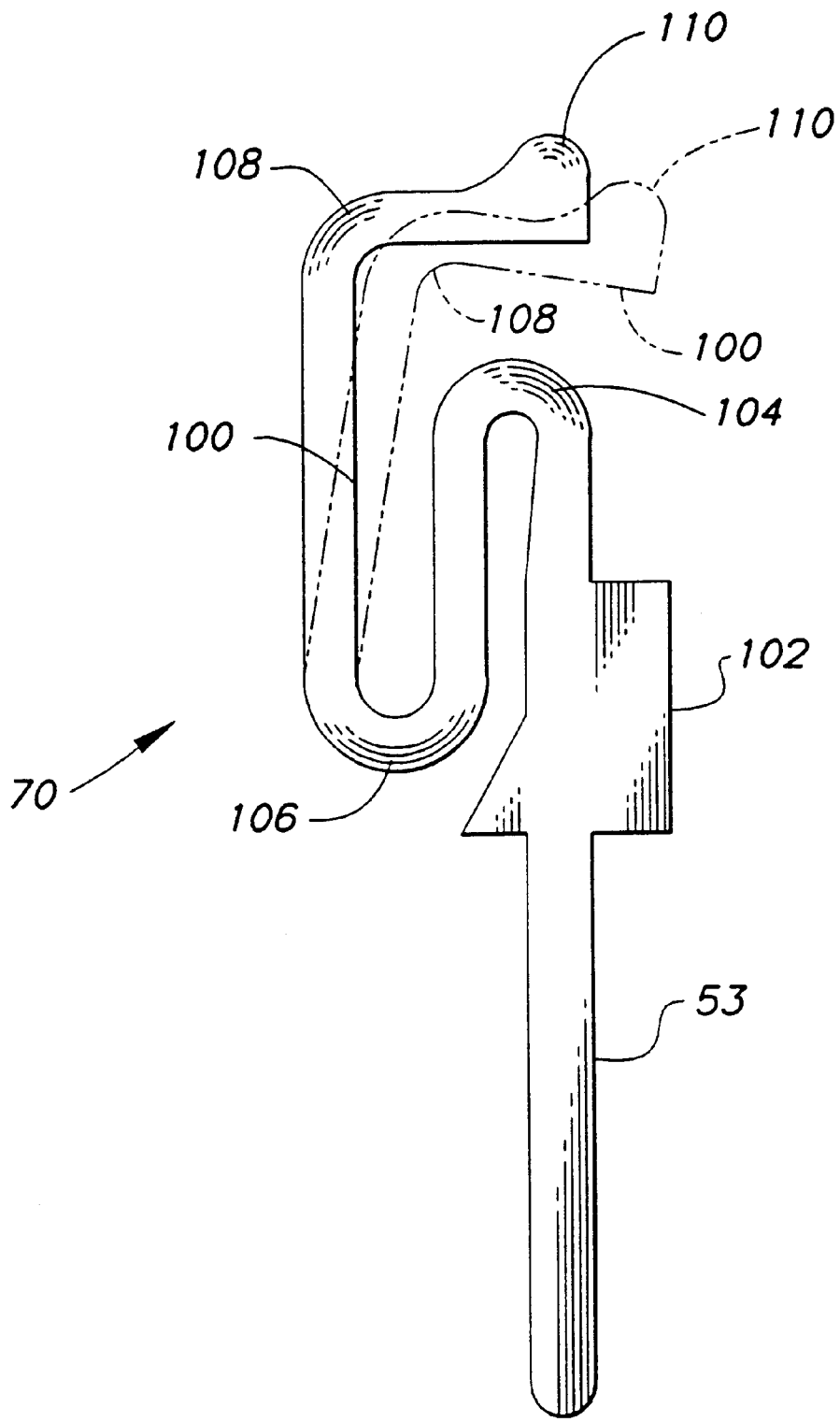
FIG. 4 shows an enlarged diagram of a single multi-curved contact according to the invention.

FIG. 4 is an enlarged diagram of a single multi-curved contact 70. The curved portion 100 and the conductive member 53 are integrally connected to form contact 70. The curved portion serves as a contact element and the conductive member forms the base of the contact. When the contact element 100 contacts a respective solder pad on a circuit substrate, the contact element is deflected as shown by the dashed lines. The conductive member 53 may serve as a pin for mounting the flexible circuit described in connection with FIG. 1. Additionally, the conductive member may be used as a through mount thereby providing an interface to connect a second circuit substrate if desired. Alternatively, the conductive member 53 can form a contact element for electrically interfacing with a solder pad on a second circuit substrate.

A contact section 102 is preferably formed on the conductive member 53. The contact section 102 is preferably designed to tightly secure the contact in a respective slot 74 of the housing 72 (see FIG. 3). Additionally, the contact section 102 is preferably sloped on one side as shown in FIG. 4 to permit contact deflection in the direction of the sloped side. It should be understood that the openings in the side surface 77 of the contact support member 73 (FIG. 3) advantageously permit the contact to additionally deflect outward for greater overall deflection capability.

A free-standing contact element according to a preferred embodiment of the invention has three contiguous curved members 104, 106, and 108 as shown in FIG. 4. A protrusion 110 is shown to extend from curved member 108. When the contact element is brought into contact or retracted from the solder pad, the protrusion is forced along the conductive surface of the solder pad. This movement across the surface of the solder pad is referred to as wipe. The curved portions 106 and 108 and protrusion 110 are deflected as the protrusion is forced along the solder pad as shown in FIG. 4 by the dashed lines. Greater wipe is often desired since the movement of the contact over the surface of a solder pad has a tendency to clean the surface of debris and break down oxides that can degrade electrical performance.

Figure 5:
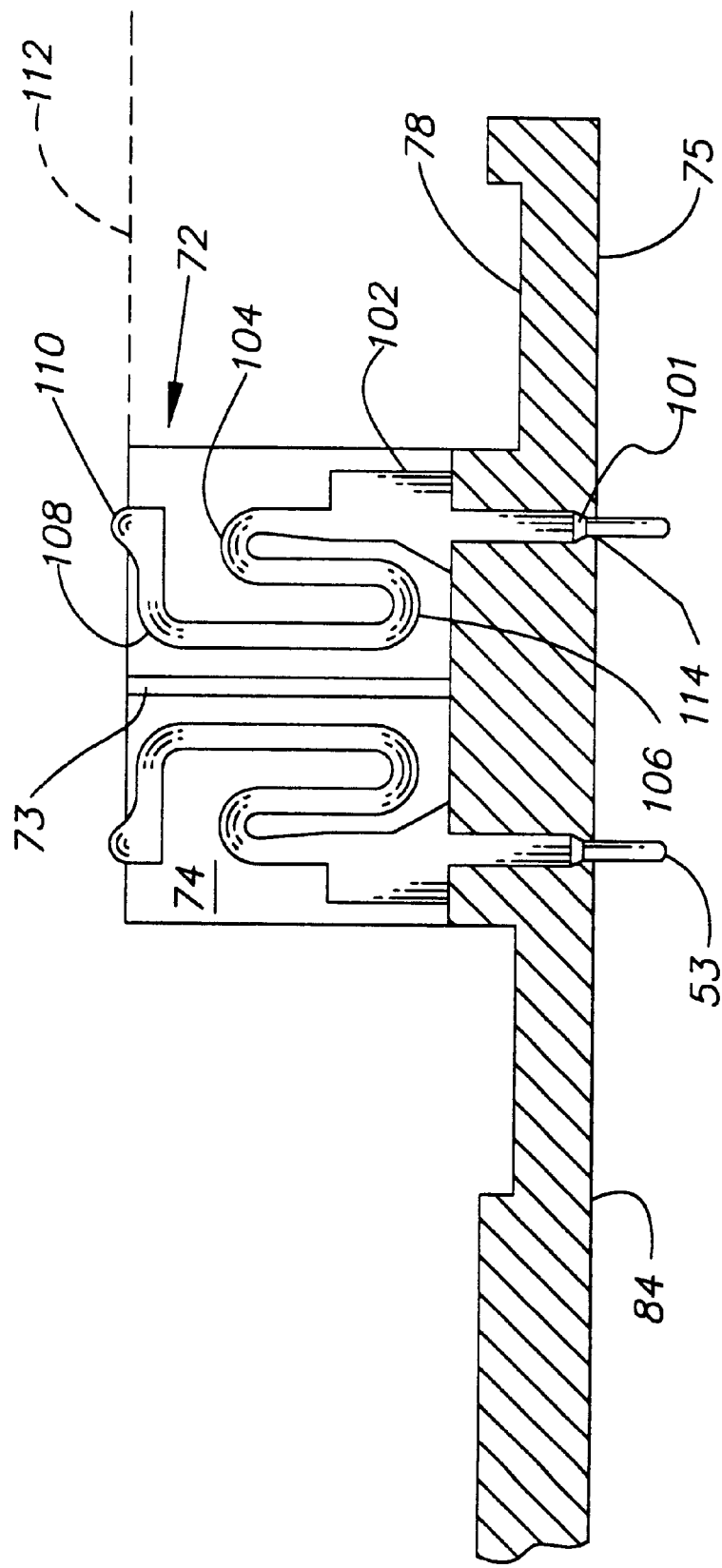
FIG. 5 shows a cross section of a compression arm connector according to the invention.

FIG. 5 is a cross section of the compression arm connector depicted in FIG. 3 showing the contacts 70 inserted into the housing 72. As shown in the figure, the first base plate portion 75 provides through holes 114 in which the conductive members 53 of the contact are inserted. A through hole 114 of the first base plate portion is capable of receiving the conductive member 53. Each conductive member 53 preferably includes a tapered section 101. When the conductive member 53 is inserted through the through hole 114, it creates an air-tight seal with the through hole to prevent contaminants from entering into the enclosed disk drive unit. The conductive member 53 also preferably forms a morse taper. The contacts are supported by the housing so that the protrusion 110 rests above the mating reference line 112.

Figure 6:
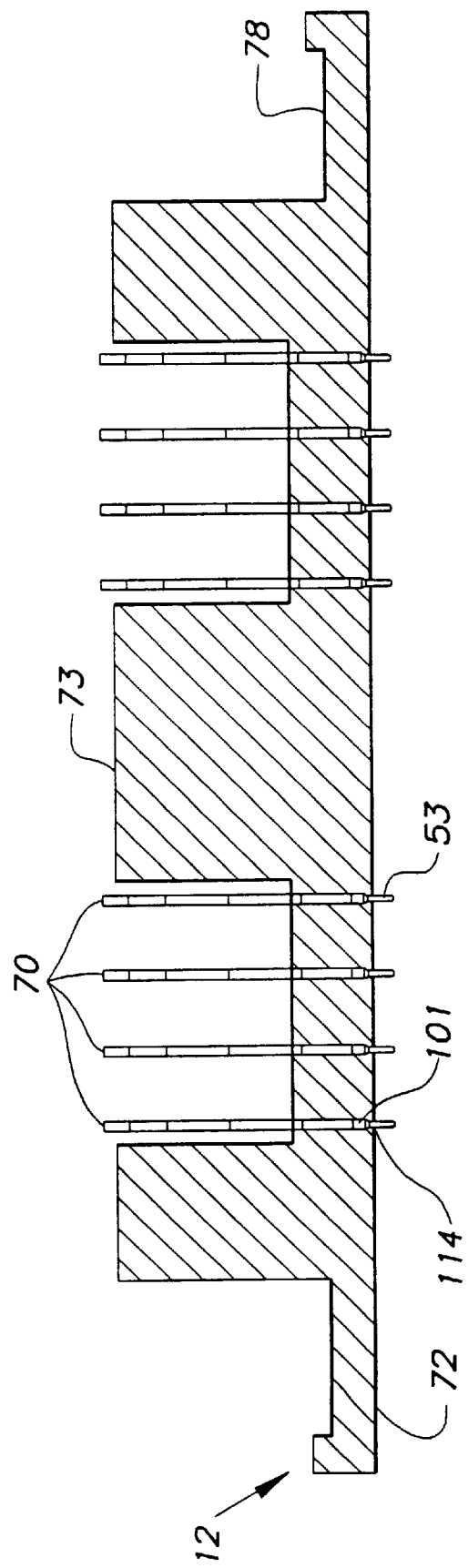
FIG. 6 shows a longitudinal cross section of a compression arm connector according to the invention.

FIG. 6 shows a longitudinal cross section of the compression arm connector 52. The housing 72 is shown with contacts 70 supported therein. The tapered section 101 and the morse taper in the conductive members 53 of the contact provides a gas-tight seal as described above.

Figure 7:
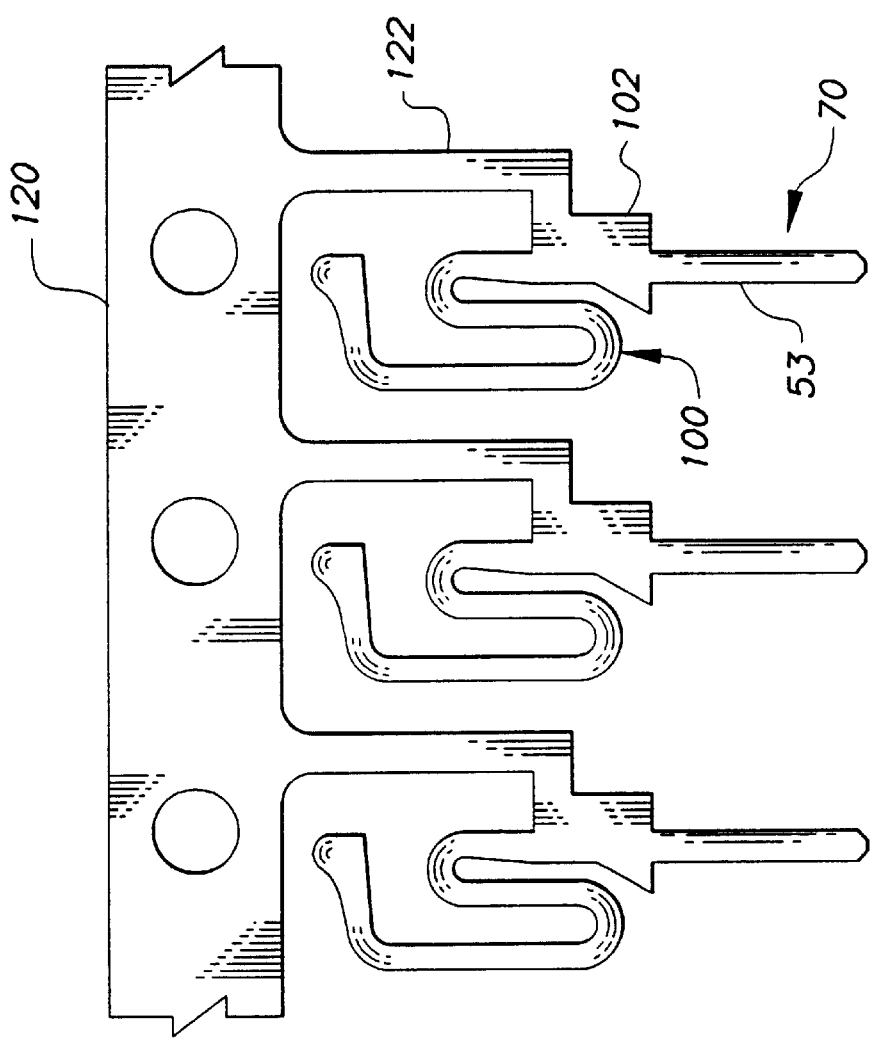
FIG. 7 shows a partial strip of contacts stamped from a plate of conductive material in accordance with the invention.

The multi-curved contacts are preferably made of a conductive material such as beryllium copper and, more preferably, phosphorous bronze. The contacts may be formed from a plate of conductive material having a thickness substantially equal to the desired thickness of the contacts. A plurality of contact elements having the desired contact shape may be stamped out of the plate of conductive material. FIG. 7 shows a partial strip of contacts formed by such a stamping process. Each of the contact elements 70 are preferably formed with a carrier attachment member 122. Each of the carrier attachment members 122 is integrally connected to a detachable carrier strip 120. The carrier attachment members 122 can be detached from the contacts along with the carrier strip 120 as is well known. It should be understood that other methods such as electronic machining and chemical etching may be used to produce the strips of contacts. However, it is preferable to provide an attached carrier, regardless of the production method used, so that the individual contacts do not require handling and can be isolated without the assistance of expensive machinery.

Figure 8:
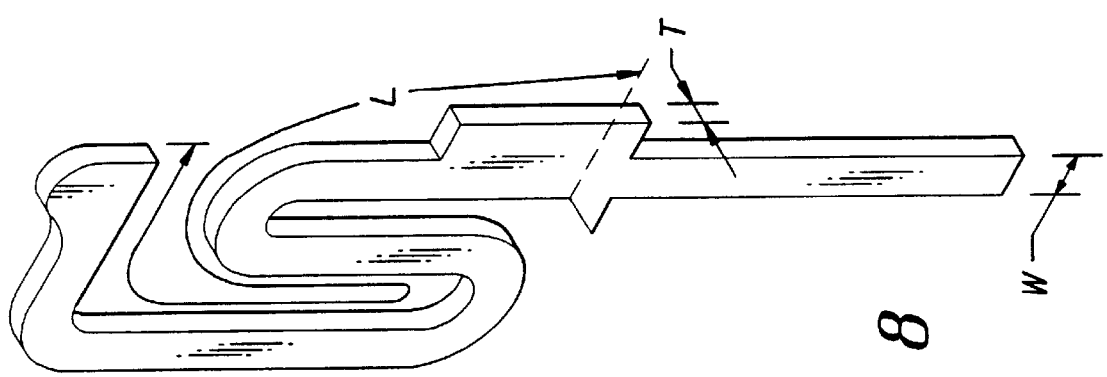
FIG. 8 identifies the dimensions of a contact of a compression arm connector in accordance with the present invention.

The contacts 70, according to a preferred embodiment of the invention, have a contact beam length of approximately 0.41 inches, a thickness of about 0.012 inches, and a contact beam width of 0.02 inches corresponding to the dimensions, L, T, and W shown in FIG. 8. In this preferred embodiment, the protrusion extends approximately 0.014 inches from member 108 of the multi-curved contact. The contacts according to the invention preferably provide more than about 100 g. of force and, more preferably, greater than about 150 g. of force against the solder pads of the circuit substrate to provide a reliable electrical interface between the circuit substrate and the compression arm connector. When interfaced with a circuit substrate with a mating force between about 100 g. and 300 g., the contacts according to this preferred embodiment, may be deflected against the solder pads between about 0.008 inches and 0.02 inches depending upon the mating force. Thus, the contacts provide a mating latitude of approximately ±0.006 inches (i.e., a compliance of about 0.014 inches ±0.006 inches). Moreover, a contact designed according to this preferred embodiment may also provide a wipe of about 0.02 inches across the surface of the solder pad. Thus, the protrusion extending from the contact element, will be forced across the surface of the solder pad approximately 0.02 inches when interfaced thereto or restricted therefrom to provide substantial cleansing of the solder pad surface.

Figure 9:
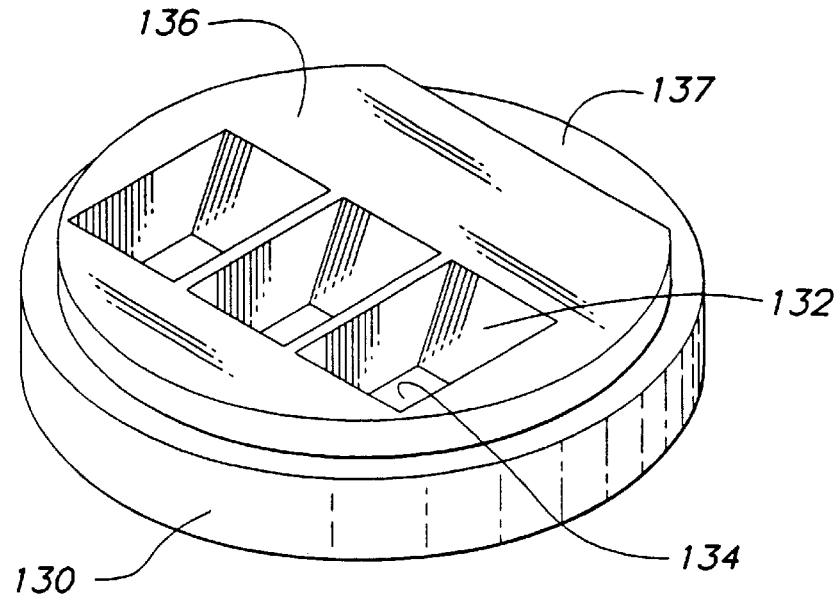
FIG. 9 shows an enlarged view of the top side of a spin motor connector according to the invention.

FIG. 9 shows an enlarged view of the top-side of the spin motor connector 56 shown in FIG. 2. A housing 130 of the spin motor connector has a number of solder windows 132 formed therein. The solder windows 132 expose a portion of the contacts 134 supported in the housing 130. Although a spin motor may use, for example, either 2, 3, or 4 lead wires for its operation, the present invention will be described in connection with those spin motors utilizing three-lead wire connections for exemplary purposes only. It should be understood that the principles dictating the design of the spin motor connector may be more generally applied to any application in which it is desired to connect any number of wires to appropriate interfaces on a circuit substrate. Thus, the present invention should not be construed to be limited to any particular number of solder windows or contacts.

Figure 10:
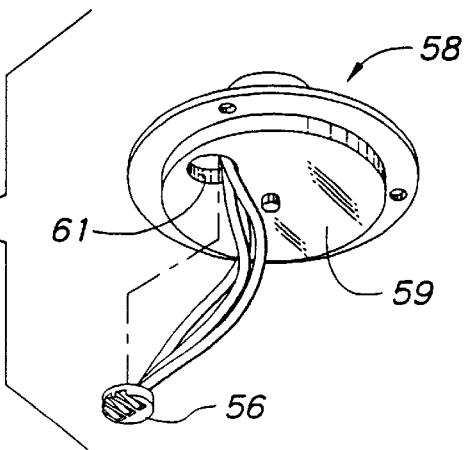
FIG. 10 shows the underside of the spin motor assembly with a spin motor connector according to the invention connected to the spin motor.

FIG. 10 shows the underside of the spin motor assembly 58 with a spin motor connector 56 connected to the spin motor (not shown). A frame 59 of the spin motor assembly 58 has an opening 61 shown in the figure in which the spin motor connector can be secured. The solder windows provide a convenient means for containing the solder and lead wires so that the housing 130 can be press-fit into the frame opening 61. Referring back to FIG. 9, the housing 130 preferably has a raised portion 136 with one or more wedges 137 cut out to provide an indication of the orientation of the contacts within the housing so that the spin motor connector is press-fit into the frame opening 61 in the correct manner.

Figure 11:
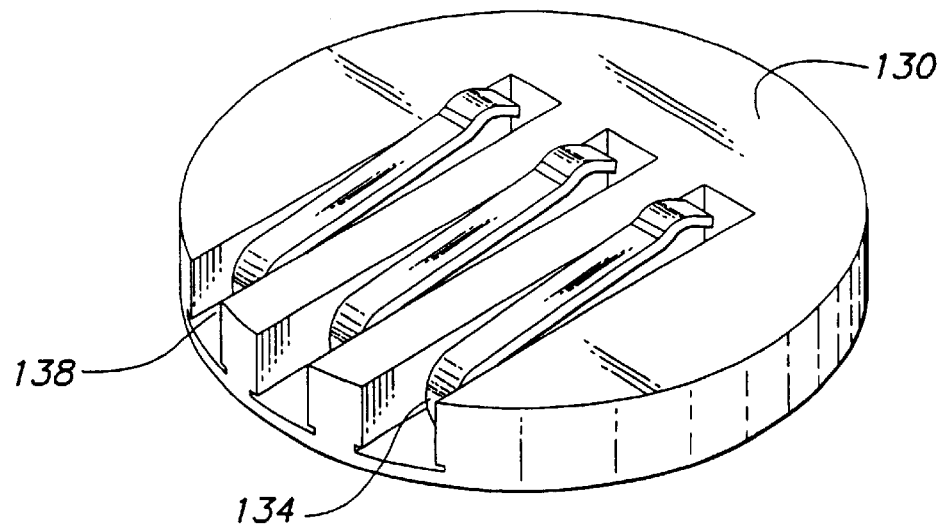
FIG. 11 shows an enlarged view of the underside of a spin motor connector according to the invention.

FIG. 11 shows an enlarged view of the underside of a spin motor connector according to the invention. Slots 138 are formed in the housing 130 to expose a second portion of each of the contacts 134. The contacts 134 exposed by slots 138 are designed to interface with solder pads on circuit substrate 54 shown in FIG. 2.

Figure 12:
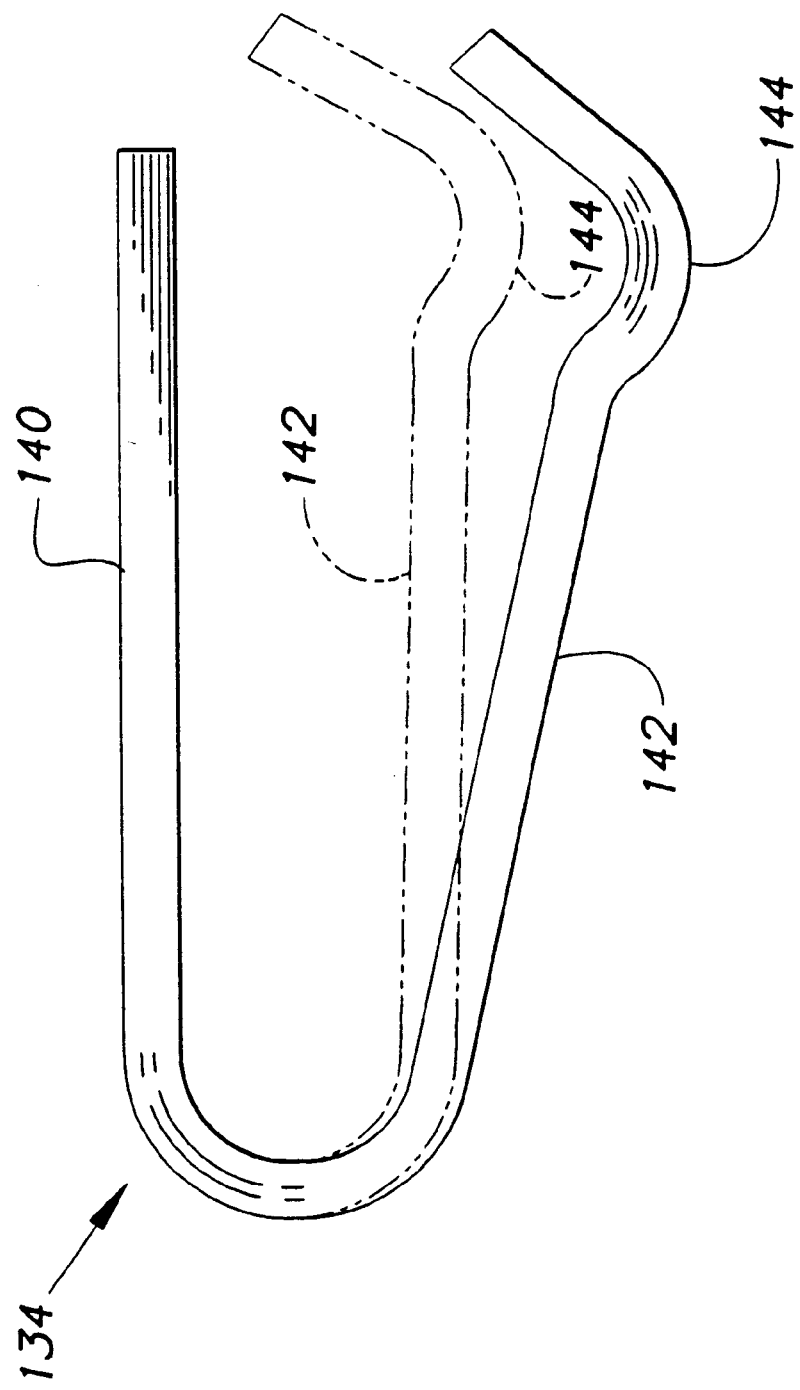
FIG. 12 shows an enlarged view of a contact designed for use in a spin motor connector according to the invention.

FIG. 12 shows an enlarged view of a contact designed for use in the spin motor connector. The contact 134 is preferably bent through an angle greater than about 90° to define two portions; a solder member 140 and a deflectable member 142. The solder member 140 is exposed through a solder window in the housing so that a wire may be soldered to the solder member through the solder window as explained above. The deflectable member 142 is exposed through a slot 138 of the spin motor housing so that the deflectable member is deflected as indicated by the dashed lines against a solder pad of an interfaced circuit substrate. In a preferred embodiment, a protrusion 144 is provided on the deflectable member 142. When the spin motor connector is interfaced with or retracted from the circuit substrate, the protrusion 144 is forced along the surface of a solder pad.

Figure 13:
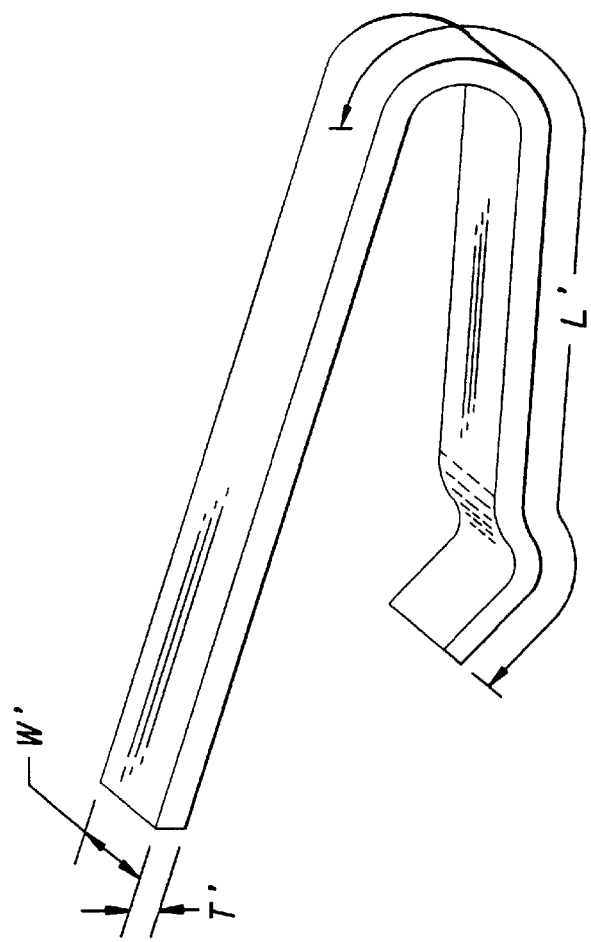
FIG. 13 identifies the dimensions of a contact of a spin motor connector in accordance with the present invention.

The contact elements 134 according to this preferred embodiment of the invention have a contact beam length of approximately 0.28 inches, a thickness of about 0.012 inches, and a contact beam width of 0.03 inches corresponding to the dimensions, L', T', and W', respectively, as shown in FIG. 13. In this preferred embodiment, the contacts may provide more than about 70 g. of force and, more preferably, greater than about 120 g. of force against the solder pads of the circuit substrate to provide a reliable electrical interface between the circuit substrate and the spin motor connector. It should be understood that the compliance of the contacts can be altered by modifying the contact's dimensions.

The contacts according to this preferred embodiment can be deflected against the solder pads between about 0.014 inches and 0.036 inches under a mating force between approximately 70 g. and 150 g. Thus, the contacts provide a mating latitude of approximately ±0.011 inches (i.e., a compliance of about 0.025 inches ±0.011 inches). Moreover, a contact designed according to this preferred embodiment may also provide a wipe of at least 0.015 inches across the conductive surface of the solder pad. Specifically, the protrusion extending from the contact element will be forced about 0.015 inches across the surface of the solder pad when interfaced to or retracted from the solder pad to provide substantial cleansing of the solder pad surface.

Figure 14:
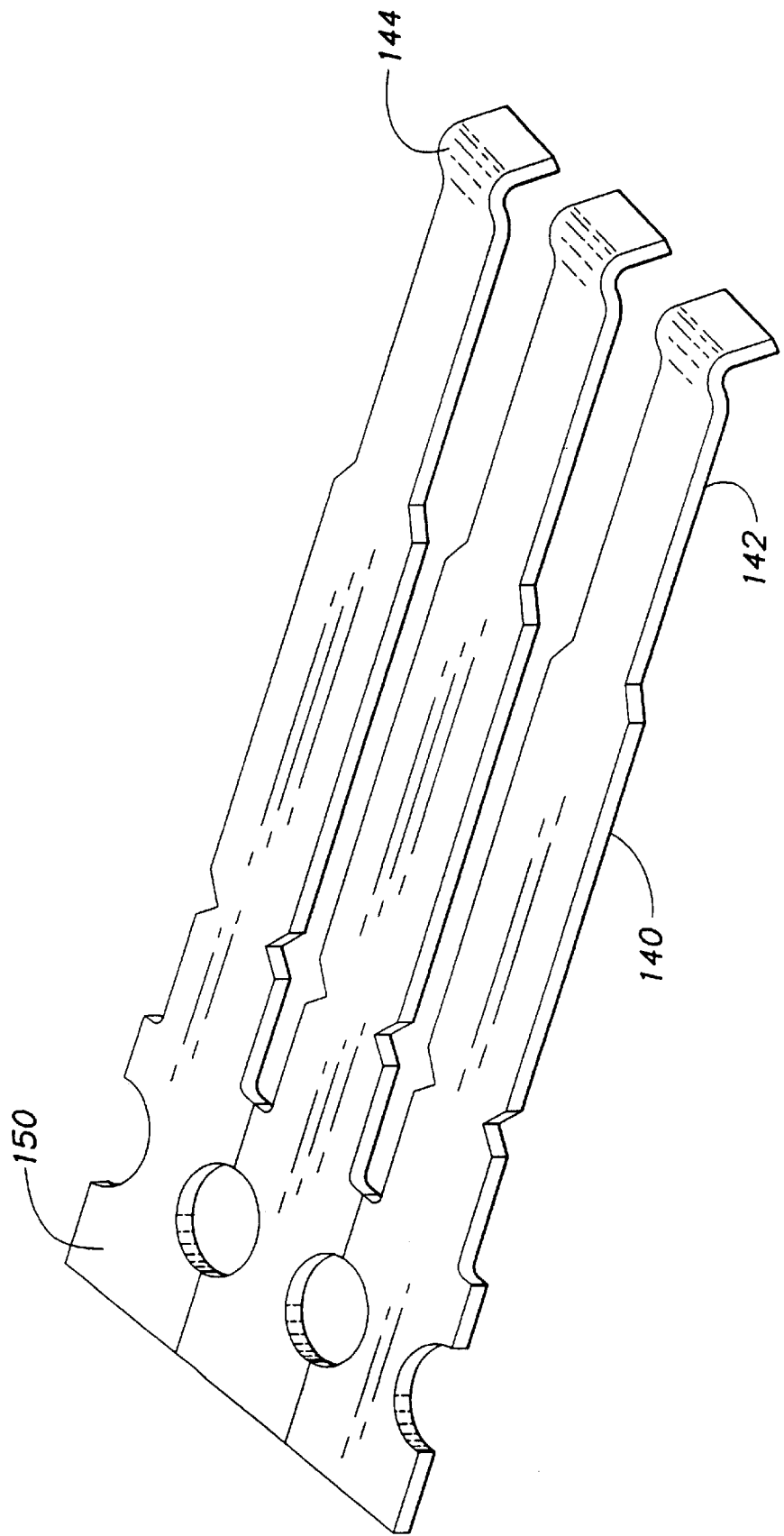
FIG. 14 shows a partial strip of contacts blanked from a plate of conductive material.

The spin motor connector is preferably produced by first stamping a plurality of contacts from a plate of conductive material. It should be understood that other methods of producing the contacts, such as spark erosion, chemical etches or single stamp processes, could likewise be used. FIG. 14 shows a partial strip of contacts blanked from a plate of conductive material. As shown in the figure, the solder member 140 is preferably wider than the deflectable member 142 to provide a larger solder surface for soldering wires. The protrusion 144 may be formed during the stamping process or the contacts may be subjected to appropriate shaping after they are blanked. The contacts 134 are preferably connected via a detachable carrier strip 150.

Figure 15:
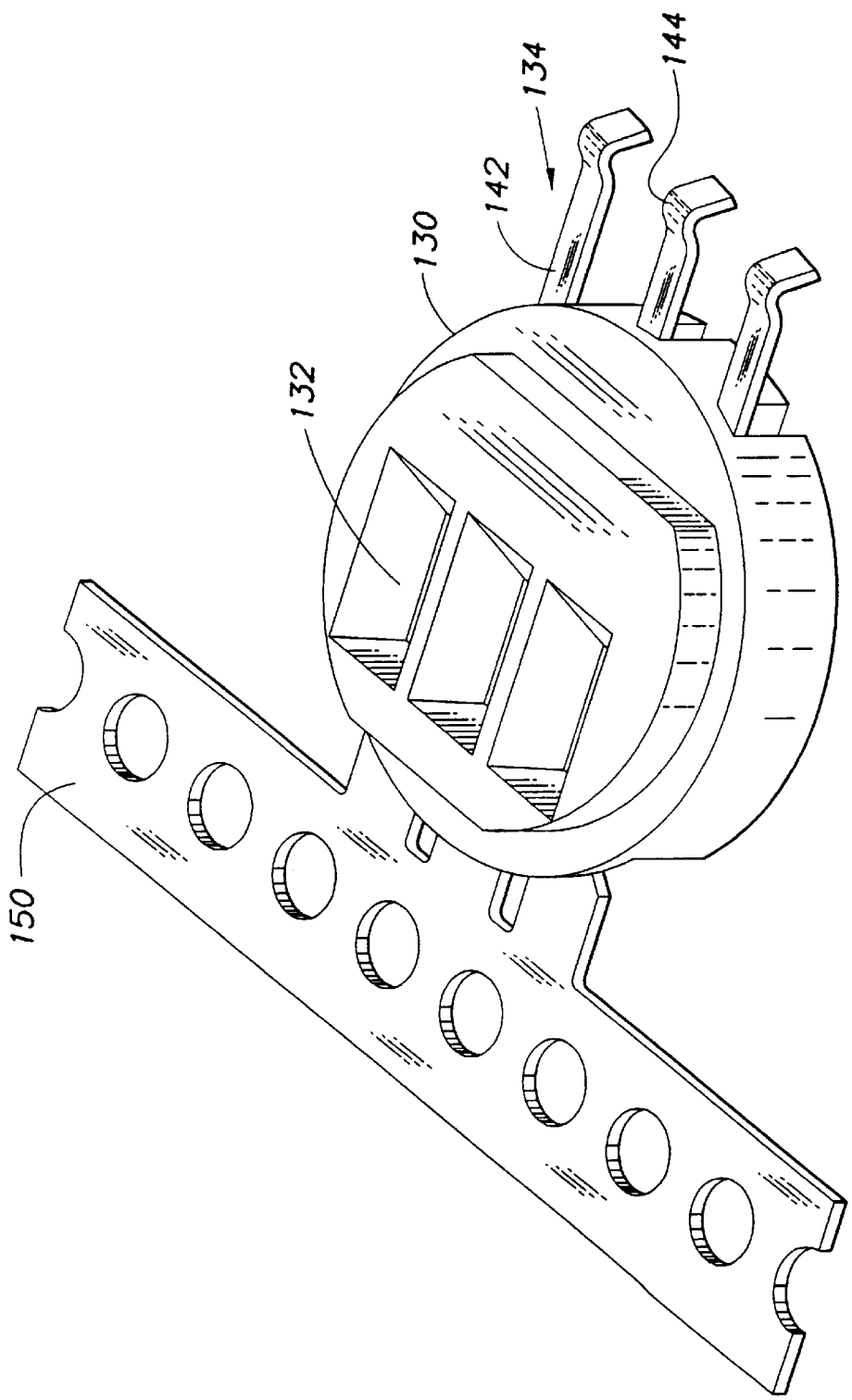
FIG. 15 shows a spin motor housing having three solder windows molded directly onto three contact elements grouped together along the carrier strip.
Figure 16:
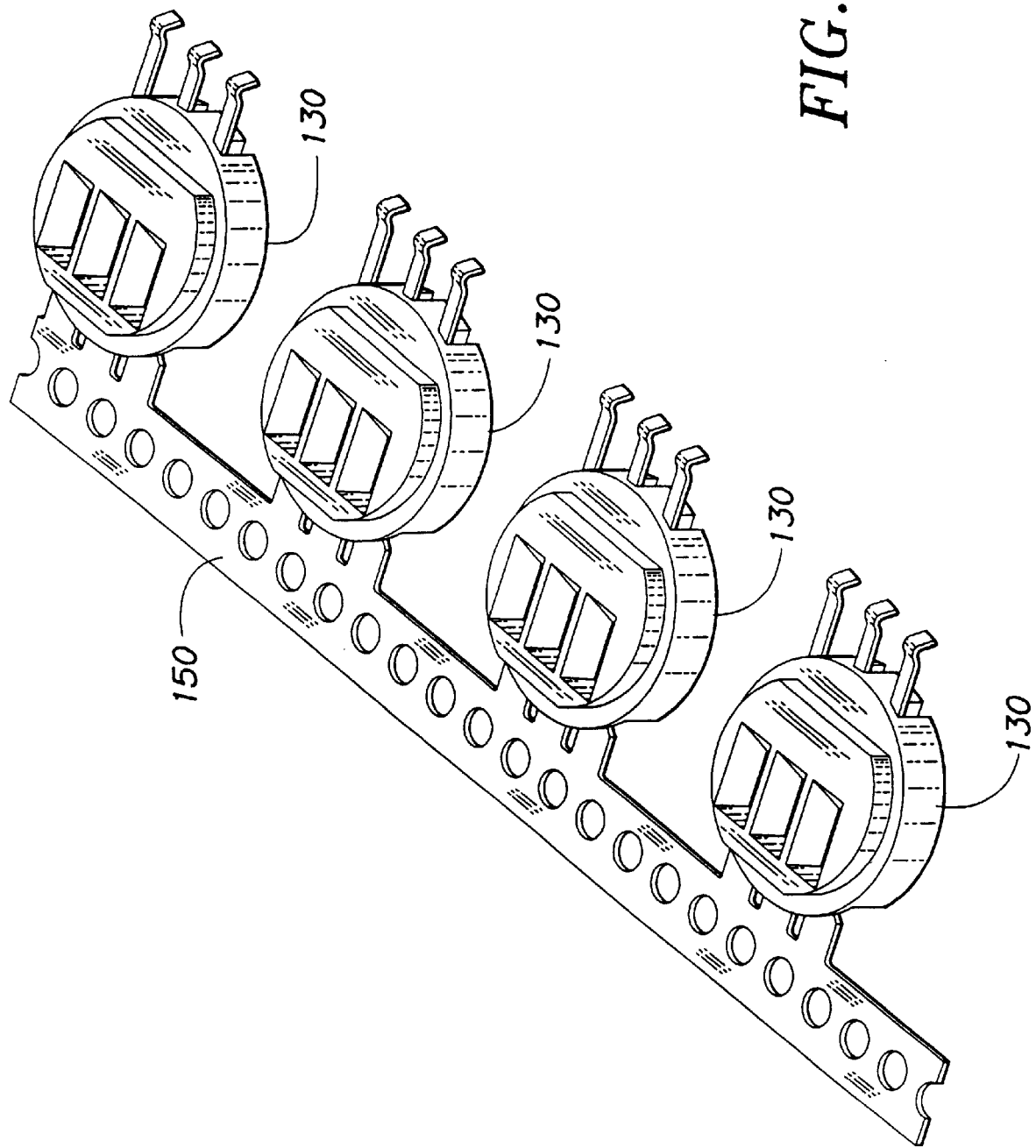
FIG. 16 shows a plurality of spin motor housings molded to respective groups of contacts along a carrier strip.

The contacts may be grouped in numbers corresponding to the number of contacts to be provided by the connector. For example, FIG. 15 shows a spin motor housing 130 having three solder windows 132 as described above, molded directly onto three contact elements 134 grouped together along the carrier strip 150. Such grouping provides production advantages in that a carrier having a plurality of connectors may be produced in an automated process. For example, FIG. 16 shows a plurality of housings 130, each being molded to a group of three contacts attached to carrier strip 150. Typically, two halves of a housing mold may be closed together with the contacts disposed in the middle. Plastic is injected, cooled and the mold opened thereby forming a connector housing as shown in FIGS. 15 and 16.

Figure 17:
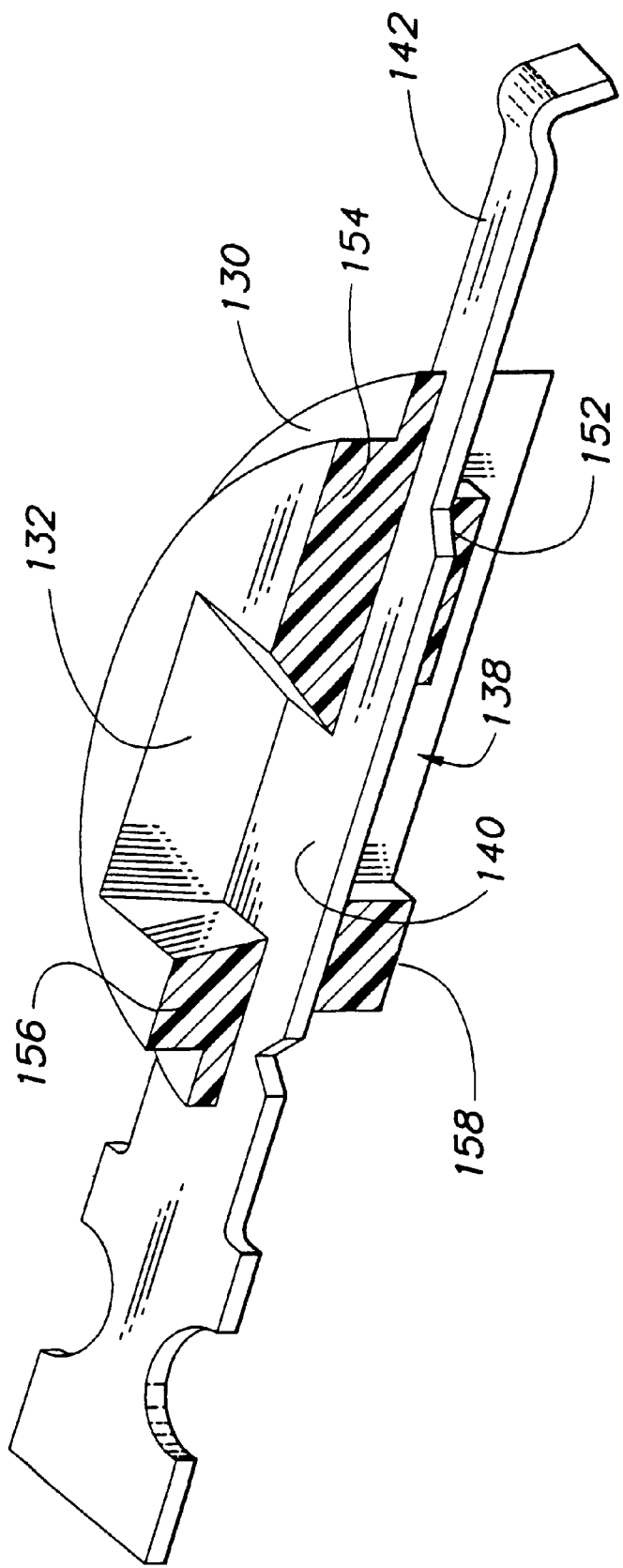
FIG. 17 shows a cross section of a spin motor connector housing with a contact molded therein according to the invention.
Figure 18:
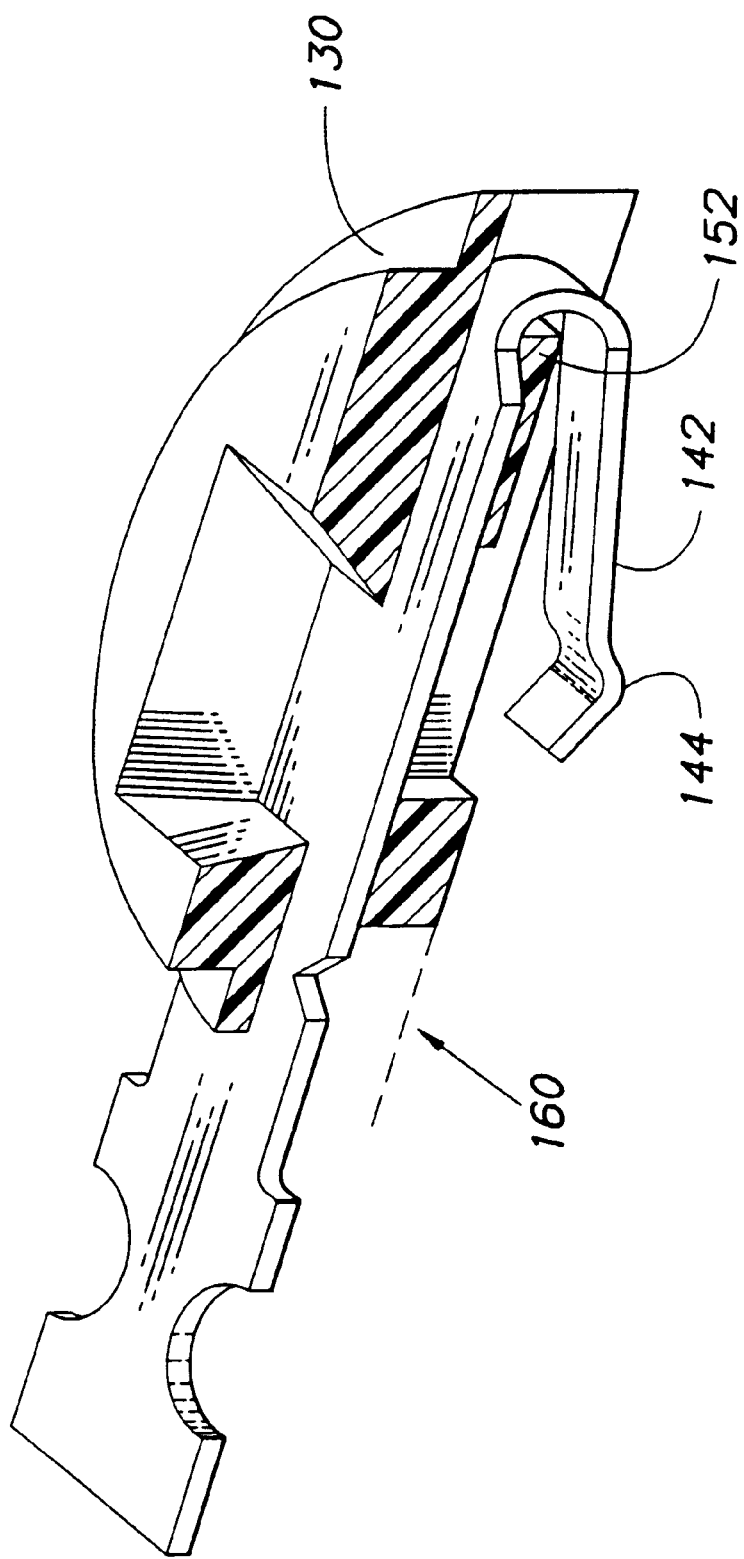
FIG. 18 shows a deflectable member of a contact of the present invention after being bent downward against a segment of the housing.

A cross section of the spin motor connector housing with a contact molded therein is shown in FIG. 17. The solder member 140 of the contact element is supported within the housing 130 between housing segments 152 and 154 and between housing segments 156 and 158. A solder window 132 is partially shown above the solder member 140. The deflectable member 142 may be bent downward against the housing segment 152 which serves as an anvil member molded into the housing and around to the underside of the housing so that the deflectable member is disposed within a corresponding slot 138 (partially shown in FIG. 17). FIG. 18 shows the deflectable member 142 after being bent downward against housing segment 152. It should be understood that the protrusion 144 remains below the bottom surface or mating reference 160 of the housing 130 after the deflectable member is bent as described.

Figure 19:
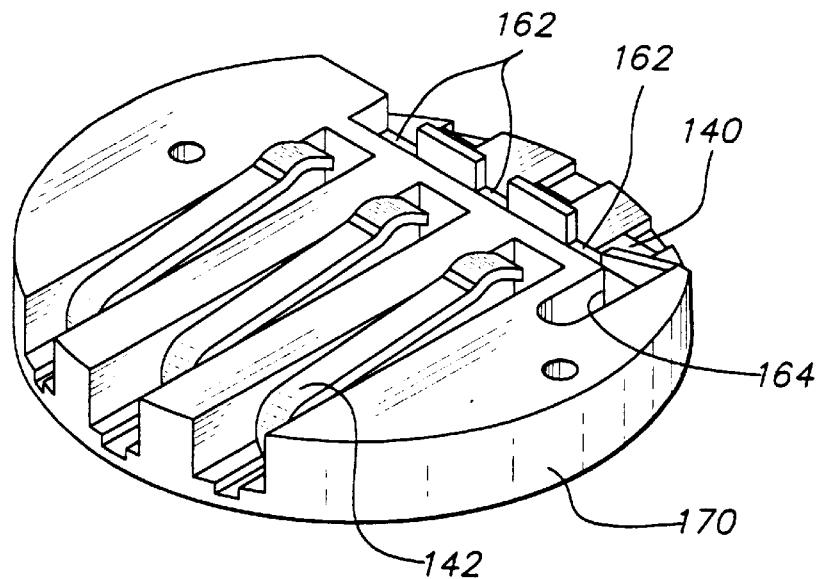
FIG. 19 shows a view of the underside of the spin motor connector according to a preferred embodiment of the invention.

A more preferred embodiment of the spin motor connector eliminates the solder windows from the housing design. An enlarged view of the underside of the spin motor connector according to this embodiment of the invention is shown in FIG. 19. A multi-wire passageway 164 connects to single-wire passageways 162, all of which may be formed in the housing during the molding process. The lead wires from the spin motor may be brought through an opening (not shown) provided in the housing 170 coincident with passageway 164.

Figure 20:
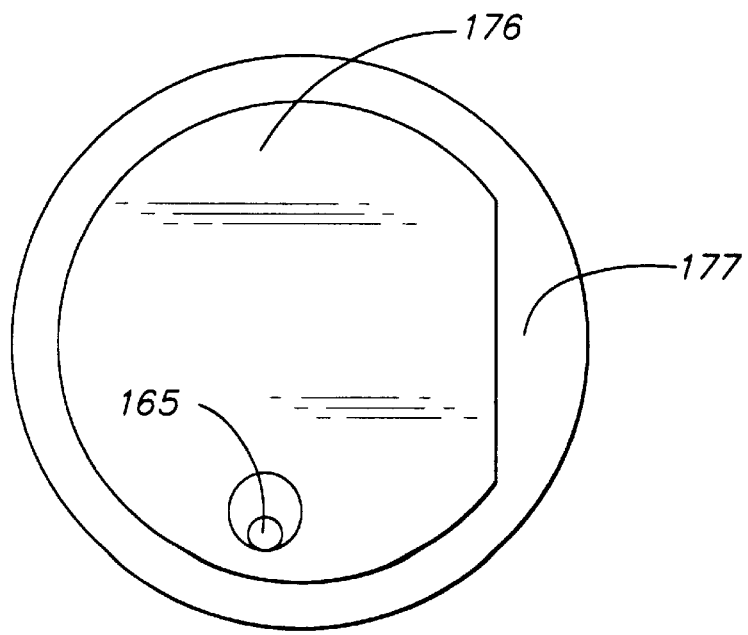
FIG. 20 shows the top side of the spin motor connector according to a preferred embodiment of the invention.

FIG. 20 shows the top-side of the spin motor connector according to this preferred embodiment. The lead wires may be inserted through the opening 165 into passageway 164 (FIG. 19). The raised portion 176 with wedge 177 identifying the orientation of the connector as described above is also shown in connection with FIG. 9. Referring back to FIG. 19, each lead wire may be brought through the opening 165 and positioned within a corresponding passageway 162 (FIG. 19). Each lead wire is then preferably soldered onto the solder member 140 in the passageway 162.

The deflectable members 142 and solder members are exposed on the same side of the housing in this embodiment instead of opposite sides as in the previously described embodiment. Exposing the solder and deflectable members on the same side of the housing is advantageous because the soldered lead wires may be inspected and adjusted if necessary without removing the spin motor assembly. For instance, once the spin motor connector shown in FIGS. 9–18 is press-fit into the frame of the spin motor assembly, it cannot be easily removed without damaging the connector or the spin motor. Therefore, if the lead wires are soldered to the solder member on the top side of the housing, the wires are inaccessible unless the connector is removed from the spin motor frame. If the connector cannot be removed from the spin motor frame, the entire spin motor assembly may require replacement. Therefore, this preferred embodiment of the spin motor connector exposes the solder members from the underside of the housing to provide access to the wires without affecting the spin motor assembly.

Figure 21:
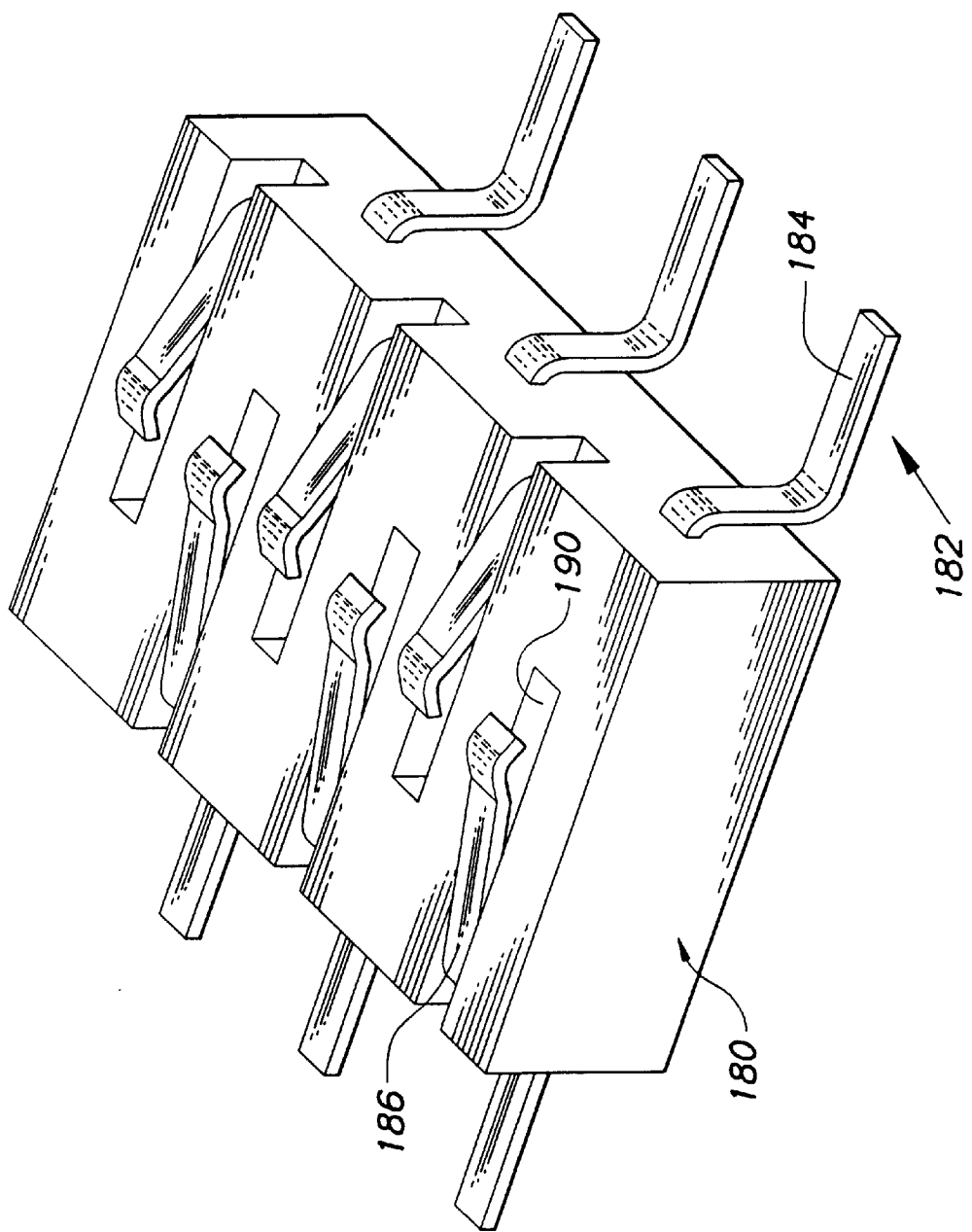
FIG. 21 shows a surface mount connector utilizing a modified spin motor connector contact according to the invention.

Additional embodiments based on the design of the spin motor connector according to the invention are shown in FIGS. 21–25. It should be understood that while the connectors shown in FIGS. 21–25 could be used to electrically interface the spin motor to solder pads on a circuit substrate, they may be used for numerous other applications. FIG. 21 shows a surface mount connector utilizing a modified spin motor connector contact. The housing 180 provides slots 190 so that the deflectable member 186 of the contact 182 is biased outward from the slot. The solder member 184 is extended and bent away from the housing 180 to serve as means for electrically interfacing and mounting the connector on the surface of a circuit substrate. The solder members 184, for example, may be soldered to respective solder pads on the circuit substrate. Thus, there is no need to provide solder windows in the embodiment shown in FIG. 21. One advantage of the connector shown in FIG. 21 is that it can be packaged via tape and reel for pick-and-place robotic assembly.

Figure 22:
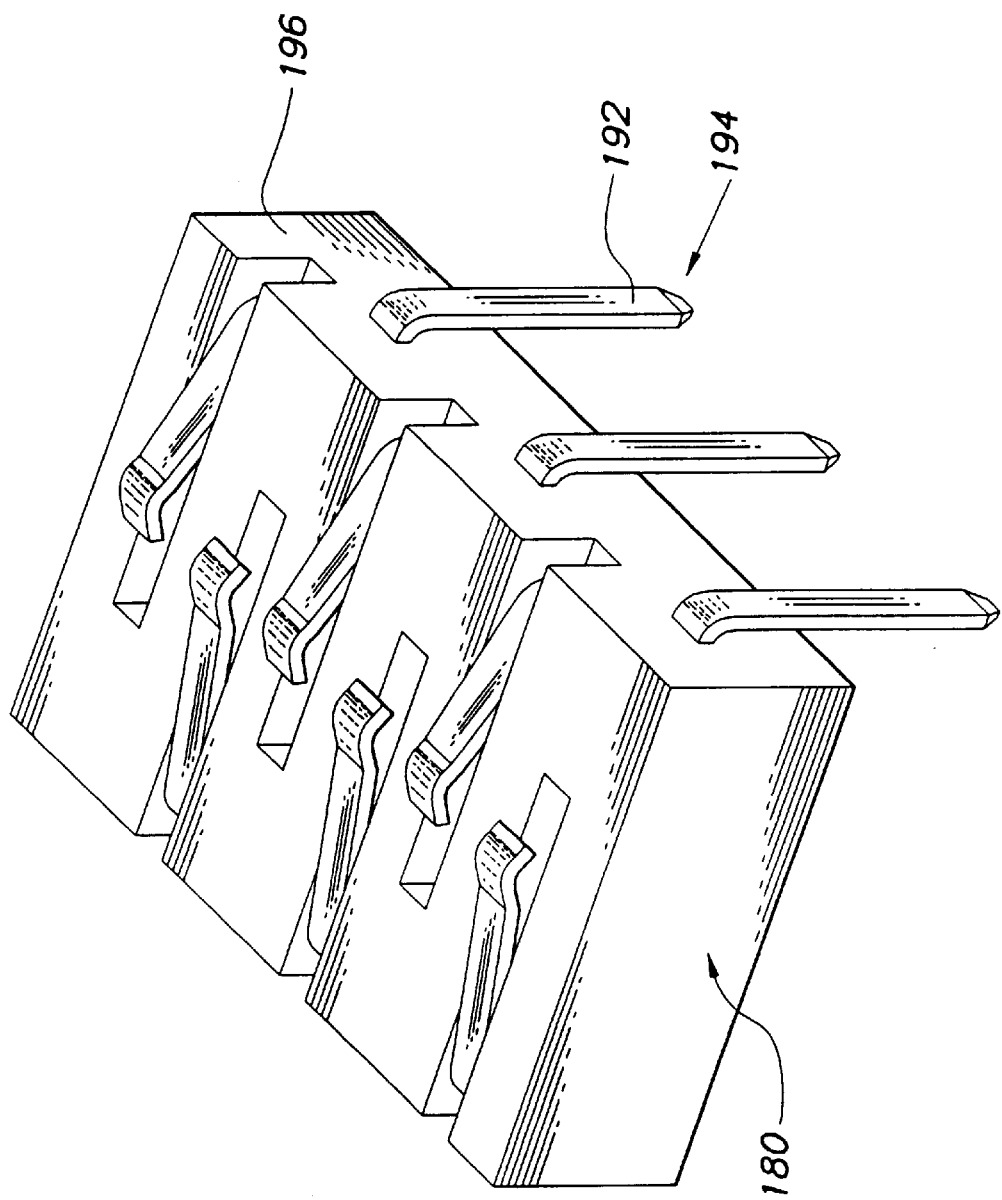
FIG. 22 shows the connector depicted in FIG. 21 with a contact designed according to a further modification of the invention.

FIG. 22 shows the connector depicted in FIG. 21 with a modified contact. Specifically, the solder member 192 of the contact 194 extends from a lateral side 196 of the housing 180 and bends downward to serve as a through mount.

Figure 23:
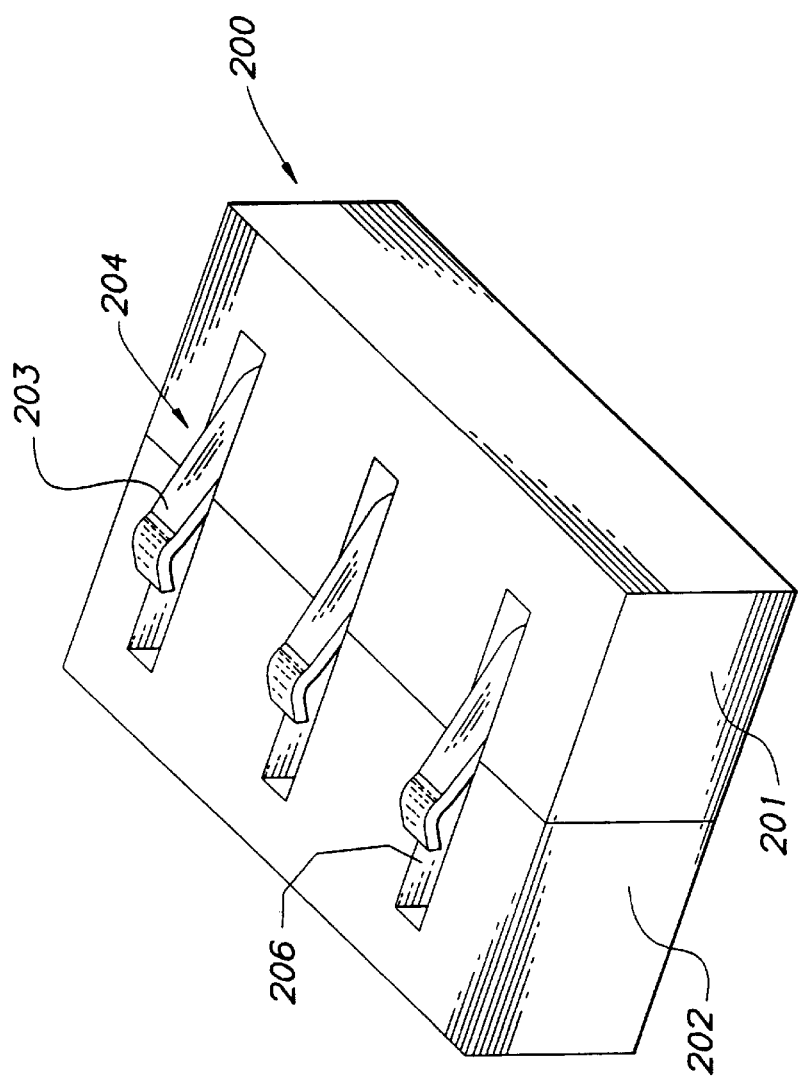
FIG. 23 shows a first side of a spin motor connector according to an alternative embodiment of the invention.
Figure 24:
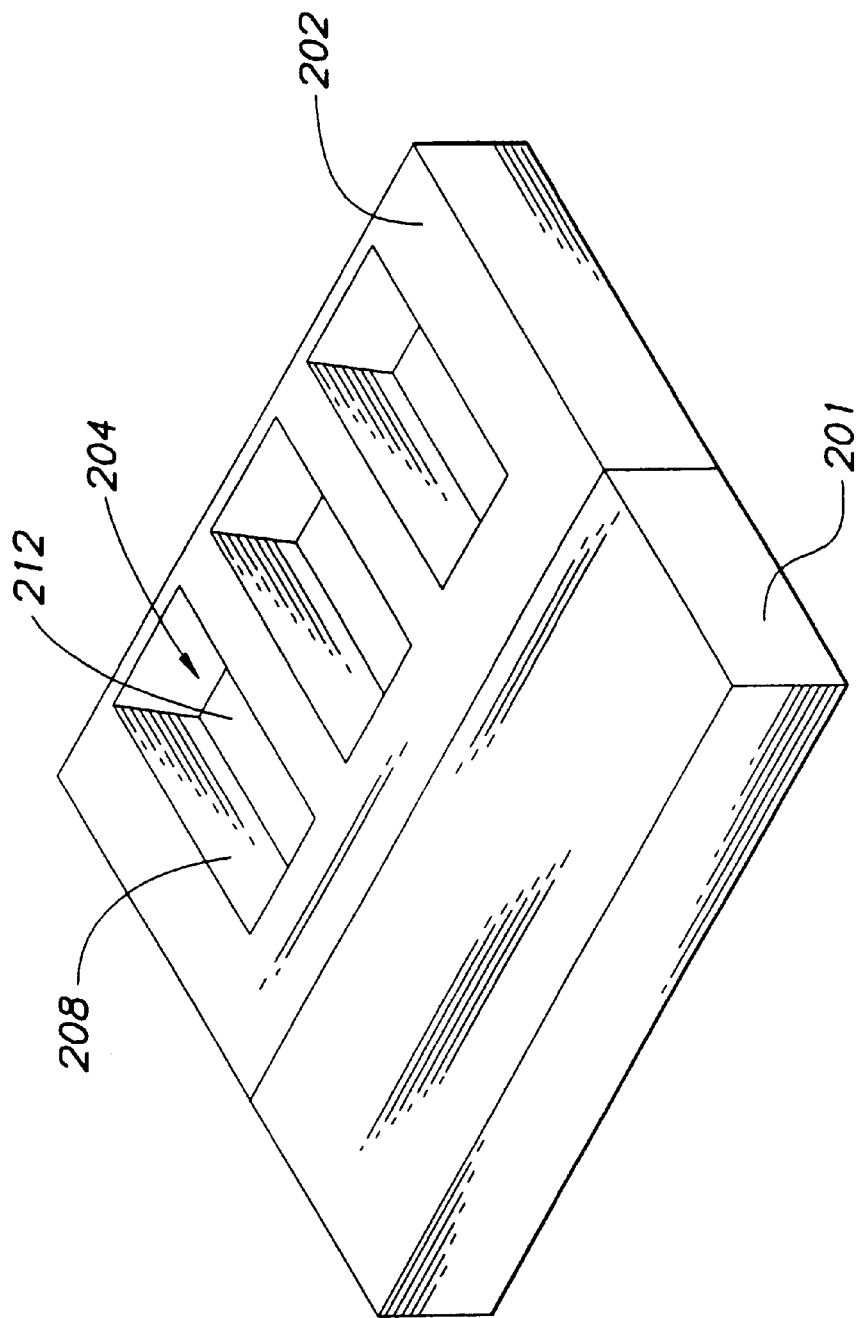
FIG. 24 shows a second side of the connector shown in FIG. 23.

FIG. 23 shows a first side of the spin motor connector according to another embodiment of the invention. The housing 200 has two interlocking parts 201 and 202. Interlocking parts 201 and 202 cooperate to form slots 206 in the housing. The deflectable members 203 of contacts 204 are biased outward from the slots 206. FIG. 24 shows a second side of the connector shown in FIG. 23. Solder windows 208 are formed in the interlocking part 202 of housing 200. Lead wires from a spin motor or other device are brought in contact with solder members 212 of contacts 204 within the solder windows 208 as shown in FIG. 24. The lead wires may then be soldered to the solder member exposed through the solder window to form an electrical interface therebetween.

Figure 25:
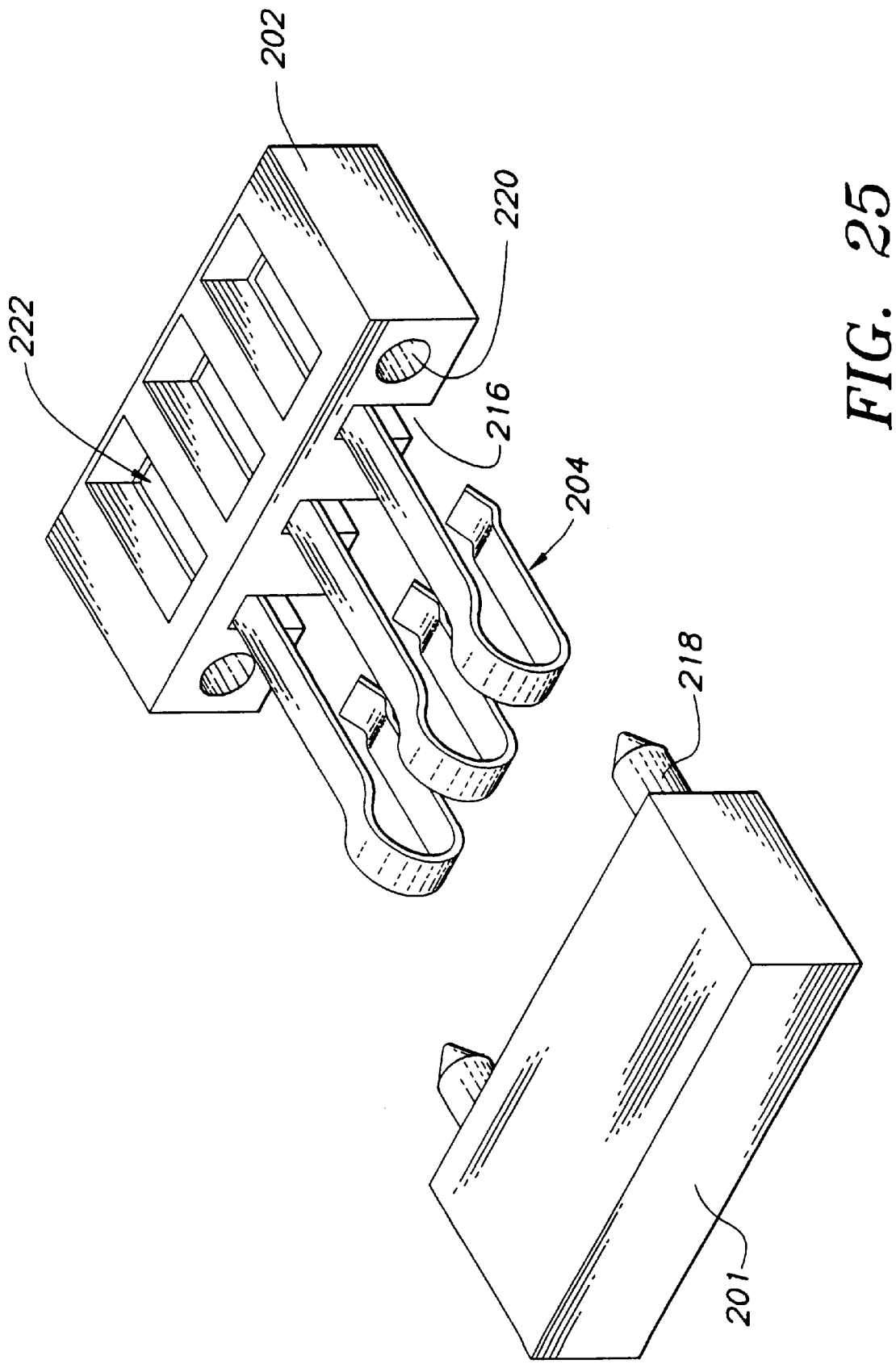
FIG. 25 shows interlocking parts of a connector housing according to an alternative embodiment of the invention.

FIG. 25 shows one embodiment of a housing that can be used for simplifying the assembly of the connector. For example, the connector shown in FIGS. 23 and 24 may be assembled by inserting the contacts 204 into respective slotted openings 216 in the interlocking part 202 of the housing. Solder windows 222 are formed in the interlocking part 202. Interlocking part 202 of the housing additionally provides one or more orifice 220. The interlocking section 201 provides one or more bolts 218 extending from a lateral surface. Preferably, a one-to-one correspondence exists between each bolt 218 and each orifice 220. When the interlocking sections 201 and 202 are locked together, each orifice 220 receives a respective bolt 218 to tightly lock the interlocking sections together to form the housing shown in FIGS. 23 and 24.

While the invention has been described and illustrated with reference to specific embodiments, those skilled in the art will recognize that modification and variations may be made without departing from the principles of the invention as described hereinabove and set forth in the following claims.

What is claimed:

1. A compression arm connector comprising:
    an insulative housing;
    a conductive element received in said insulative housing for electrically interfacing a first and a second substrate, comprising:
        a first elongated portion oriented generally perpendicular to the first substrate and adapted to engage the first substrate;
        a second elongated portion generally parallel to said first elongated portion and positionable adjacent the second substrate;
        a third elongated portion located between and generally parallel to said first and second elongated portions;
        a first generally U-shaped bend joining said first and second elongated portions;
        a second generally U-shaped bend joining said second and third elongated portions; and
        a cantilevered element angularly extending from said second elongated portion and having a protrusion thereon adapted to engage the second substrate;
    wherein said cantilevered element deflects against a conductive surface of the second substrate to laterally wipe said protrusion across said conductive surface to produce a wipe of at least about 0.02 inches.

2. The compression arm connector of claim 1, wherein said cantilevered element provides a mating force of at least about 100 g.

3. The compression arm connector of claim 1, wherein said cantilevered element provides a mating force of at least about 150 g.

4. The compression arm connector of claim 1, wherein said cantilevered element deflects between at least about 0.008 inches and about 0.02 inches in response to a mating force of between at least 100 g. and 300 g.

5. The compression arm connector of claim 1, wherein said cantilevered element deflects approximately 0.014 inches with a mating latitude of about ±0.006 inches.

6. The compression arm connector of claim 5, wherein said cantilevered element is deflected as said protrusion wipes said conductive surface and the ratio of the wipe to deflection is greater than 1.

7. The compression arm connector of claim 1, wherein said first elongated portion has a taper, said first elongated portion being received in said insulative housing so that said taper creates a gas-tight seal.

8. The compression arm connector of claim 1, wherein said first elongated portion is a pin.

9. The compression arm connector of claim 1, wherein said first elongated portion forms an electrical interface with a solder pad on said first substrate.

10. The compression arm connector of claim 1, wherein a plurality of conductive elements are received in said insulative housing and wherein each said conductive element is associated with one first elongated portion extending from said insulative housing.

11. The compression arm connector of claim 1, wherein said insulative housing comprises a base portion and a contact support section, at least a part of the base portion and a part of the contact support section having a reduction in thickness.

12. The compression arm connector of claim 1, wherein said insulative housing comprises a contact support section having a slot in which said cantilevered element is inserted, said slot providing openings on a top side and at least a lateral side of said support section so that the deflection of said cantilevered element is not restrained by said insulative housing.

13. The compression arm connector of claim 1, wherein said wipe is produced responsive only to said cantilevered element contacting said conductive surface of the second substrate.

14. A conductive element for electrically interfacing a first and a second substrate, comprising:
    a first elongated portion oriented generally perpendicular to the first substrate and adapted to engage the first substrate;
    a second elongated portion generally parallel to said first elongated portion and positionable adjacent the second substrate;
    a third elongated portion located between and generally parallel to said first and second elongated portions;
    a first generally U-shaped bend joining said first and second elongated portions;
    a second generally U-shaped bend joining said second and third elongated portions; and
    a cantilevered element angularly extending from said second elongated portion and having a protrusion thereon adapted to engage the second substrate;
    wherein said cantilevered element deflects against a conductive surface of the second substrate to laterally wipe said protrusion across said conductive surface.

15. The conductive element of claim 14,
    wherein said protrusion forms a mating portion of said cantilevered element and wherein said cantilevered element is deflected against said conductive surface so that said protrusion is wiped in a lateral direction of at least about 0.02 inches over said conductive surface in response to said deflection when the conductive element is mated with the second substrate.

16. The conductive element of claim 15, wherein the ratio of wipe to deflection is greater than 1.

17. The conductive element of claim 16, wherein said cantilevered element is deflected approximately 0.014 inches with a mating latitude of about ±0.006 inches.

18. The conductive element of claim 15, wherein the cantilevered element substantially overlies said first, second, and third elongated portions.

19. The conductive element of claim 15, wherein said wipe is produced responsive only to said cantilevered element being deflected against said conductive surface of the second substrate.

* * * * *